United States Patent
Madan et al.

(10) Patent No.: US 10,349,284 B2
(45) Date of Patent: *Jul. 9, 2019

(54) SYSTEM AND METHOD TO PROVIDE UPLINK INTERFERENCE COORDINATION IN A NETWORK ENVIRONMENT

(71) Applicant: CISCO TECHNOLOGY, INC., San Jose, CA (US)

(72) Inventors: Ritesh K. Madan, Berkeley, CA (US); Rohit Umesh Nabar, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/630,696

(22) Filed: Jun. 22, 2017

(65) Prior Publication Data

US 2017/0295515 A1 Oct. 12, 2017

Related U.S. Application Data

(63) Continuation of application No. 14/961,552, filed on Dec. 7, 2015, now Pat. No. 9,826,408.

(51) Int. Cl.
*H04W 72/00* (2009.01)
*H04W 16/10* (2009.01)
(Continued)

(52) U.S. Cl.
CPC ........ *H04W 16/10* (2013.01); *H04W 28/0236* (2013.01); *H04W 28/04* (2013.01)

(58) Field of Classification Search
CPC ..... H04W 8/183; H04W 48/18; H04W 36/30; H04W 36/18; H04W 36/12; H04W 36/04;
(Continued)

(56) References Cited

U.S. PATENT DOCUMENTS 6,456,848 B1 9/2002 Freeman et al.
6,463,296 B1 10/2002 Esmailzadeh et al.
(Continued)

FOREIGN PATENT DOCUMENTS

EP 2018781 A1 1/2009
EP 2166714 A1 3/2010
WO 0038351 A2 6/2000

OTHER PUBLICATIONS

IPO Mar. 27, 2017 Intellectual Property Office Combined Search and Examination Report under Sections 17 and 18(3) from Application No. GB1703805.0; 5 pages.
(Continued)

*Primary Examiner* — Dai A Phuong
(74) *Attorney, Agent, or Firm* — Patterson + Sheridan, LLP

(57) ABSTRACT

A method is provided in one example embodiment and may include determining for each of one or more macro cell radios, a corresponding set of one or more small cell radios that are under a coverage area of each of the one or more macro cell radios, wherein each corresponding set is associated with a corresponding macro cell radio; calculating interference coordination parameters for each small cell radio belonging to each corresponding set, wherein the interference coordination parameters for each small cell radio belonging to each corresponding set comprises an uplink interference budget for each small cell radio; and communicating the interference coordination parameters to each small cell radio belonging to each corresponding set.

20 Claims, 10 Drawing Sheets

(51) Int. Cl.
*H04W 28/02* (2009.01)
*H04W 28/04* (2009.01)

(58) Field of Classification Search
CPC ..... H04W 16/32; H04W 24/00; H04W 28/04; H04W 72/082
USPC .................. 455/436–453, 456.1–456.3, 513, 455/522–526, 63.1, 67.13–67.16; 370/329–334
See application file for complete search history.

(56) References Cited

U.S. PATENT DOCUMENTS

| | | | |
|---|---|---|---|
| 7,151,937 B2 | 12/2006 | Jin et al. | |
| 7,158,474 B1 | 1/2007 | Gerakoulis | |
| 7,379,739 B2 | 5/2008 | Rajkotia et al. | |
| 7,884,763 B2 | 2/2011 | Na et al. | |
| 7,983,667 B2 | 7/2011 | Hart et al. | |
| 8,107,950 B2 | 1/2012 | Amerijoo et al. | |
| 8,275,376 B2 | 9/2012 | Vikberg | |
| 8,320,965 B2 | 11/2012 | Kwun | |
| 8,340,711 B1 | 12/2012 | Glass et al. | |
| 8,538,337 B2 | 9/2013 | Damnjanovic | |
| 8,588,698 B2 | 11/2013 | Brisebois | |
| 8,611,299 B2 | 12/2013 | Yang et al. | |
| 8,639,243 B2 | 1/2014 | Radulescu et al. | |
| 8,712,459 B2 | 4/2014 | Lim et al. | |
| 8,755,791 B2 | 6/2014 | Bontu et al. | |
| 8,761,826 B2 | 6/2014 | Brown et al. | |
| 8,792,886 B2 | 7/2014 | Meshkati | |
| 8,830,936 B2 | 9/2014 | Ren | |
| 8,838,125 B2 | 9/2014 | Dalsgaard et al. | |
| 8,854,998 B2 | 10/2014 | Johansson et al. | |
| 8,862,134 B1 | 10/2014 | Zhou | |
| 9,094,831 B2 | 7/2015 | Borran et al. | |
| 9,648,569 B2 | 5/2017 | Madan et al. | |
| 9,655,102 B2 | 5/2017 | Uplenchwar et al. | |
| 2006/0094372 A1* | 5/2006 | Ahn ..................... | H04L 1/0003 455/67.13 |
| 2007/0115874 A1 | 5/2007 | Usuda et al. | |
| 2008/0045227 A1 | 2/2008 | Nagai | |
| 2008/0151804 A1* | 6/2008 | Wang ................... | H04B 7/0689 370/312 |
| 2009/0092080 A1 | 4/2009 | Balasubramanian et al. | |
| 2009/0197632 A1 | 8/2009 | Ghosh et al. | |
| 2010/0248737 A1 | 9/2010 | Smith | |
| 2011/0039539 A1 | 2/2011 | Maida et al. | |
| 2011/0077016 A1 | 3/2011 | Stolyar et al. | |
| 2011/0098072 A1 | 4/2011 | Kim et al. | |
| 2011/0201277 A1 | 8/2011 | Eguchi | |
| 2011/0250926 A1* | 10/2011 | Wietfeldt ............... | H01Q 1/243 455/525 |
| 2012/0115534 A1 | 5/2012 | Luo et al. | |
| 2012/0208578 A1* | 8/2012 | Jeong .................. | H04W 52/244 455/501 |
| 2012/0236774 A1 | 9/2012 | Guey et al. | |
| 2012/0243431 A1 | 9/2012 | Chen et al. | |
| 2013/0281089 A1* | 10/2013 | Chandrasekhar ..... | H04W 24/02 455/434 |
| 2013/0310019 A1 | 11/2013 | Visotsky et al. | |
| 2014/0087747 A1 | 3/2014 | Kronestedt et al. | |
| 2014/0200001 A1 | 7/2014 | Song et al. | |
| 2014/0233530 A1 | 8/2014 | Damnjanovic et al. | |
| 2014/0302851 A1 | 10/2014 | Yiu et al. | |
| 2014/0307685 A1 | 10/2014 | Takano | |
| 2014/0321304 A1 | 10/2014 | Yu et al. | |
| 2014/0328327 A1 | 11/2014 | Kiao et al. | |
| 2014/0378124 A1* | 12/2014 | Meshkati ............. | H04W 16/16 455/422.1 |
| 2014/0378145 A1 | 12/2014 | Legg et al. | |
| 2015/0004975 A1 | 1/2015 | Yamamoto et al. | |
| 2015/0063225 A1 | 3/2015 | Kanamarlapudi et al. | |
| 2015/0105025 A1 | 4/2015 | Zhang et al. | |
| 2015/0237637 A1 | 8/2015 | Venkatraman et al. | |
| 2015/0282033 A1 | 10/2015 | Lunden et al. | |
| 2015/0282104 A1 | 10/2015 | Damnjanovic et al. | |
| 2015/0312778 A1* | 10/2015 | Chandrasekhar ..... | H04W 24/02 455/419 |
| 2015/0312918 A1* | 10/2015 | Dimou ................ | H04W 72/082 455/422.1 |
| 2015/0365865 A1 | 12/2015 | Belschner et al. | |
| 2016/0072568 A1* | 3/2016 | Mun ..................... | H04L 1/0026 375/267 |
| 2016/0315728 A1 | 10/2016 | Palenius et al. | |
| 2017/0041938 A1 | 2/2017 | Nabar et al. | |
| 2017/0064707 A1 | 3/2017 | Xiao et al. | |
| 2017/0150384 A1 | 5/2017 | Rune et al. | |
| 2018/0234195 A1* | 8/2018 | Raghavan ............. | H04W 24/02 |

OTHER PUBLICATIONS

PRC Apr. 7, 2017 SIPO First Office Action from Chinese Application No. 201280058324.X; 14 pages (English translation only).
U.S. Appl. No. 15/089,252.
U.S. Appl. No. 15/374,903.
U.S. Appl. No. 15/335,931.
U.S. Appl. No. 14/818,084.
U.S. Appl. No. 14/848,026.
U.S. Appl. No. 14/811,580.
U.S. Appl. No. 14/816,957.
U.S. Appl. No. 14/816,990.
U.S. Appl. No. 14/686,598.
U.S. Appl. No. 14/691,260.
U.S. Appl. No. 14/809,201.
U.S. Appl. No. 14/833,519.
U.S. Appl. No. 14/918,420.
U.S. Appl. No. 14/951,987.
U.S. Appl. No. 15/002,187.

* cited by examiner

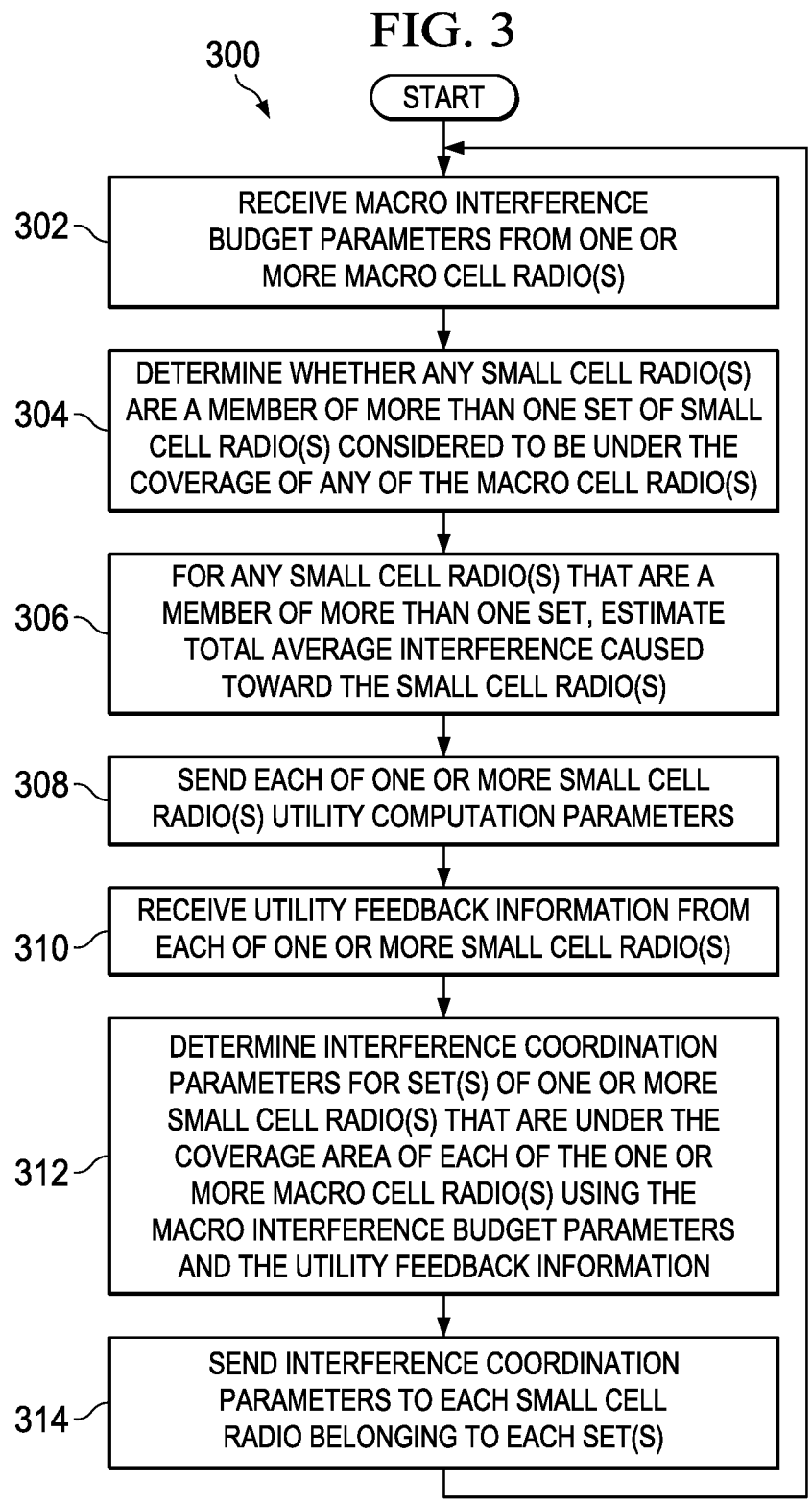

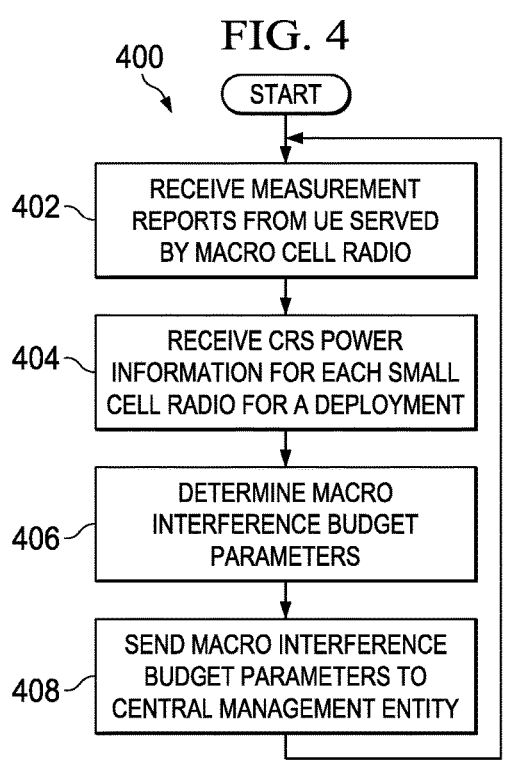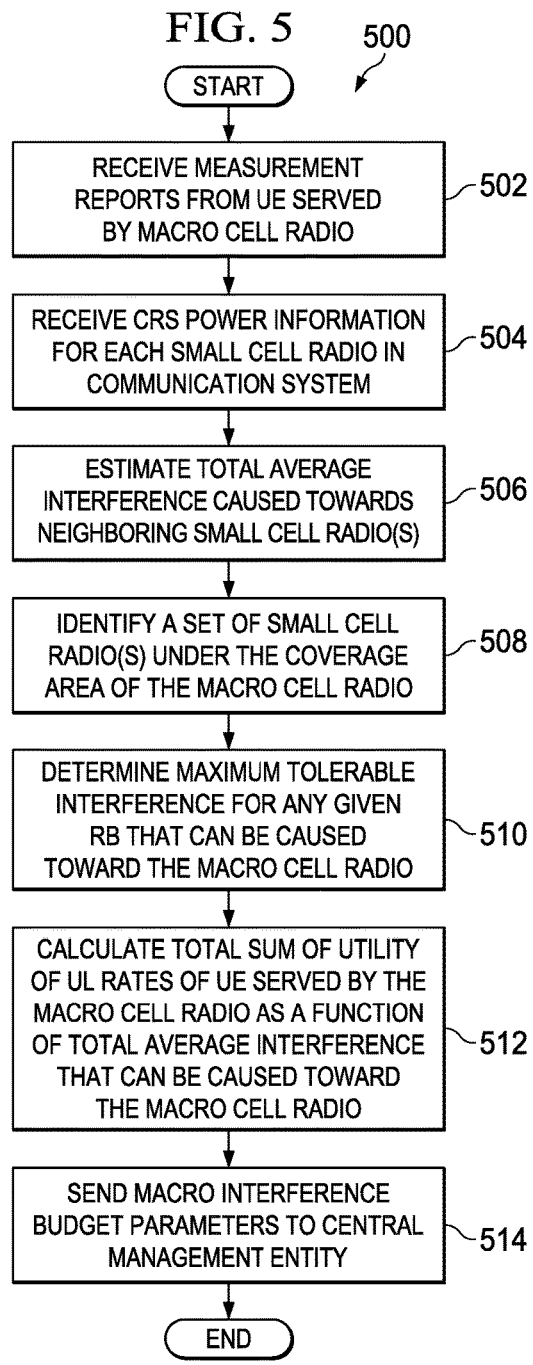

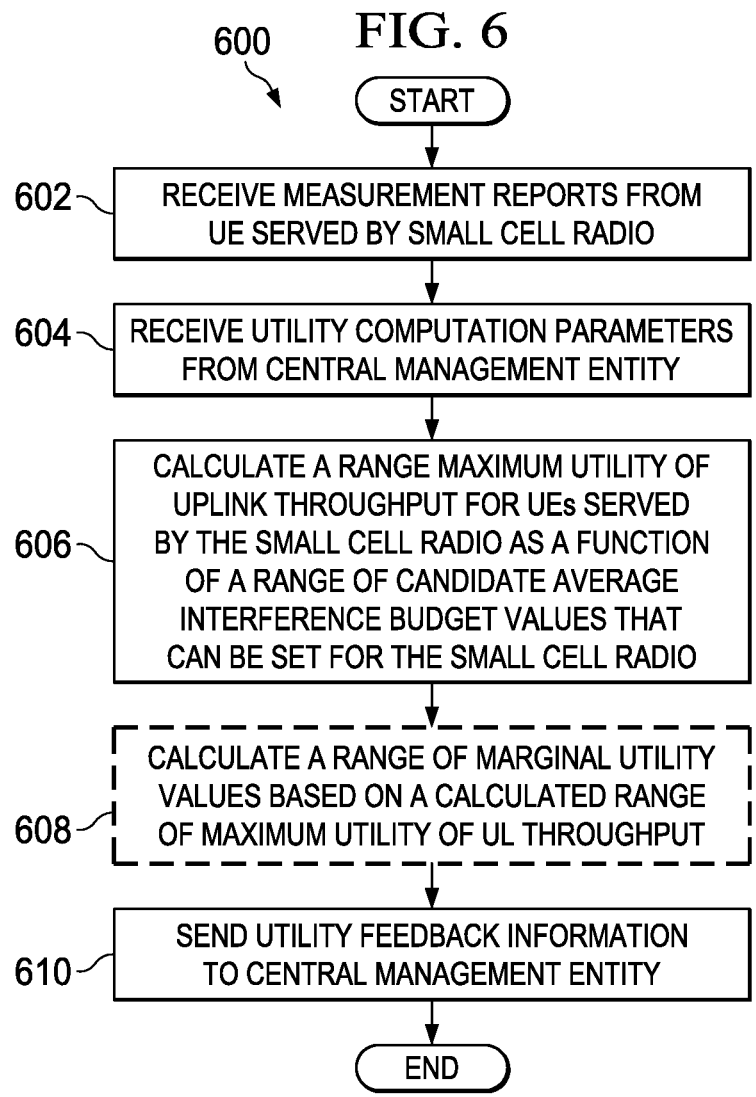

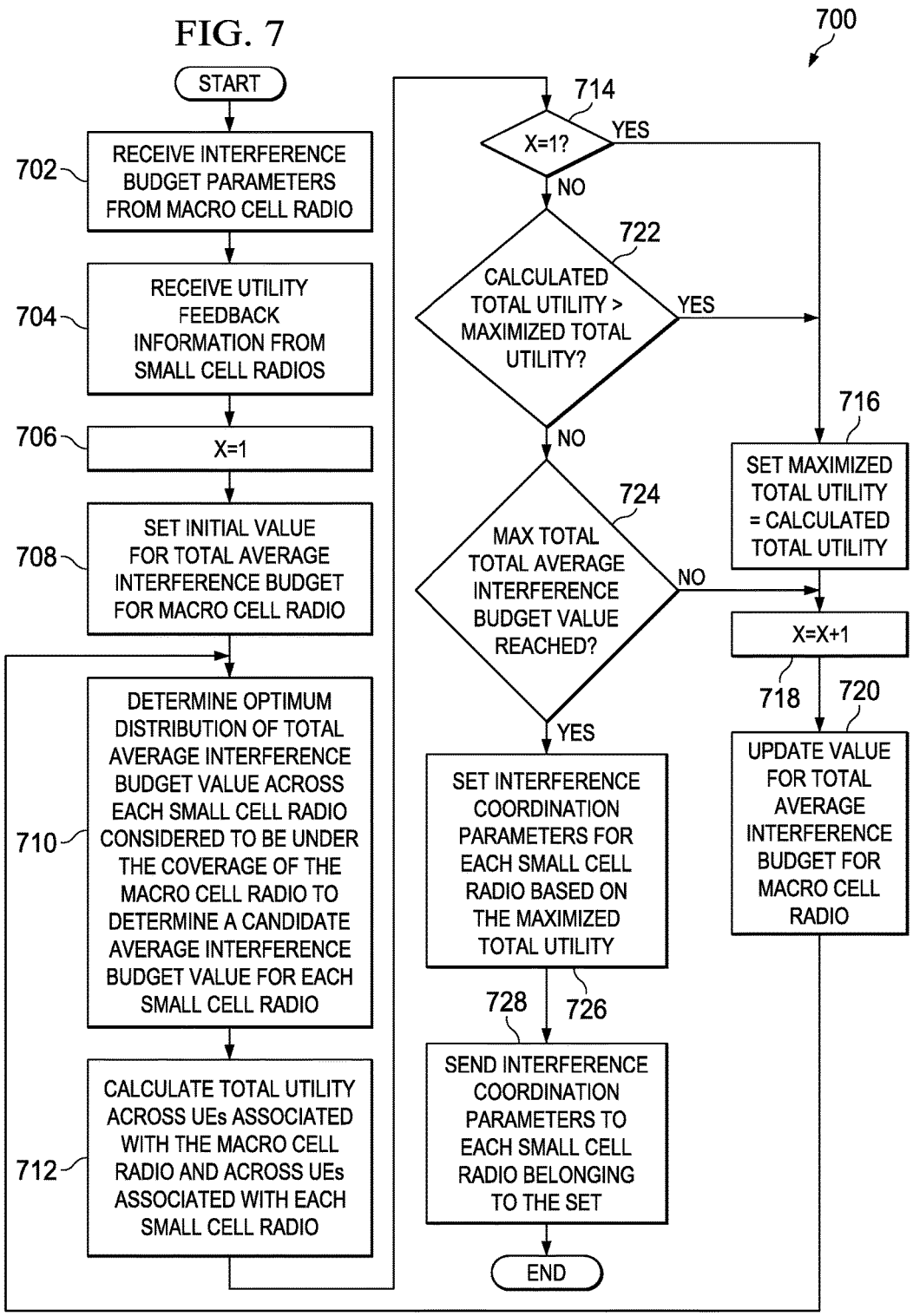

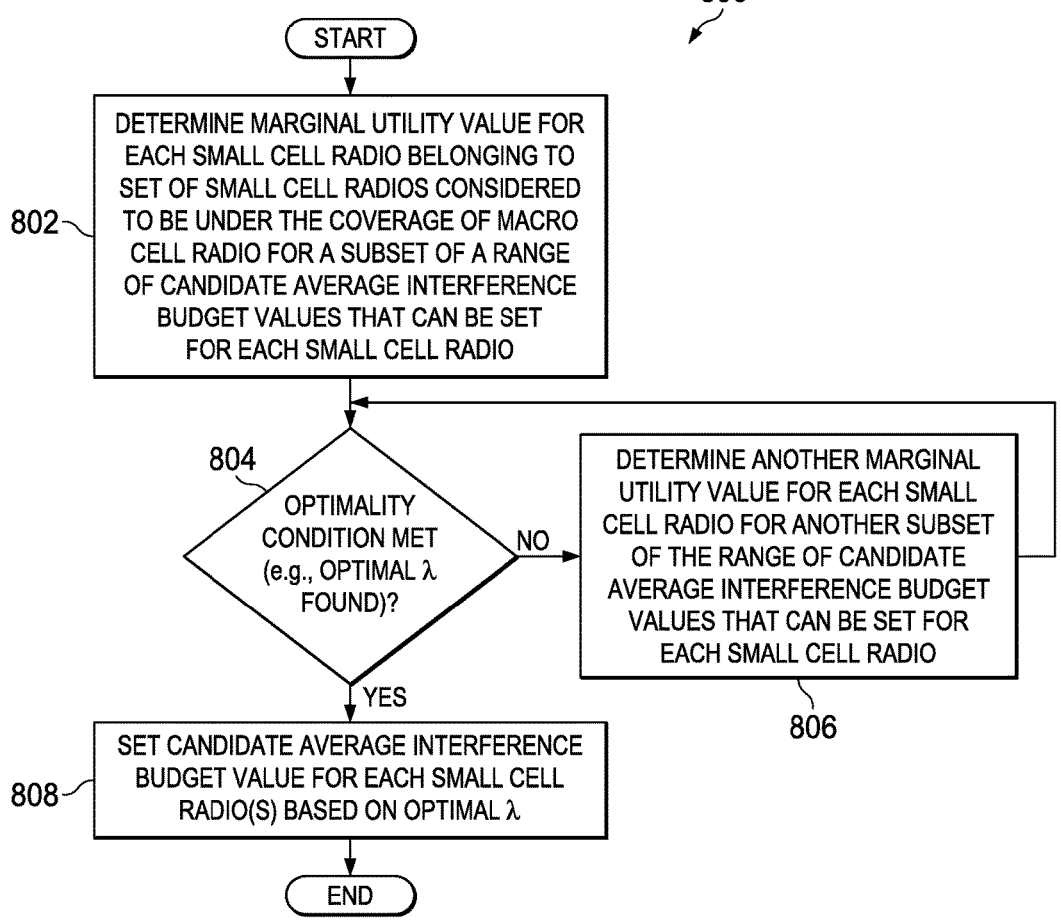

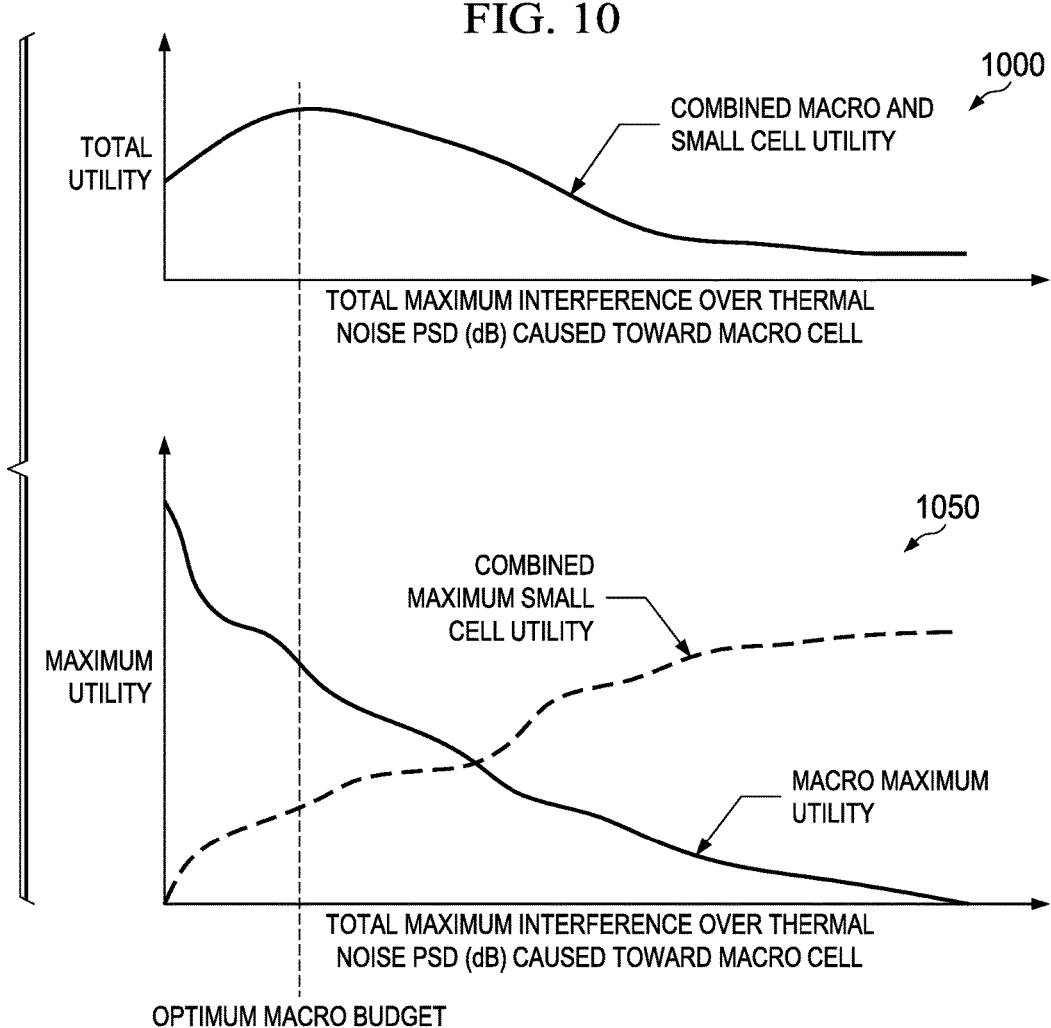

SYSTEM AND METHOD TO PROVIDE UPLINK INTERFERENCE COORDINATION IN A NETWORK ENVIRONMENT

PRIORITY DATA

This application is a continuation (and claims the benefit of priority under 35 U.S.C. § 120) of U.S. application Ser. No. 14/961,552, filed Dec. 7, 2015, entitled "SYSTEM AND METHOD TO PROVIDE UPLINK INTERFERENCE COORDINATION IN A NETWORK ENVIRONMENT," Inventors Ritesh K. Madan, et al. The disclosure of the prior application is considered part of (and is incorporated in its entirety by reference in) the disclosure of this application.

TECHNICAL FIELD

This disclosure relates in general to the field of communications and, more particularly, to a system and method to provide uplink interference coordination in a network environment.

BACKGROUND

Networking architectures have grown increasingly complex in communications environments, particularly mobile wireless environments. Mobile communication networks have grown substantially in subscriber base as end users become increasingly connected to mobile wireless environments. As the number of mobile subscribers increases, efficient management of communication resources becomes more critical. Uplink transmissions are typically scheduled for user equipment (UE) served by a particular cell radio. Generally, power control for the uplink transmissions varies depending on path loss between UE and a serving cell radio. In some cases, uplink transmissions cause interference to other neighboring cell radios. In the case of small cell networks, uplink transmissions towards a serving small cell radio can cause interference to neighboring small cell radios as well as neighboring macro cell radios. As the number of user equipment (e.g., the number of subscribers) increases, the possibility of uplink interference between neighboring cell radios also increases, which can lead to inefficient network and UE performance. Accordingly, there are significant challenges in determining small cell uplink interference in a network environment.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 is a simplified flow diagram illustrating example operations that can be associated with providing uplink interference coordination in a network environment in accordance with one potential embodiment of the communication system;

FIG. 4 is a simplified flow diagram illustrating other example operations that can be associated with providing uplink interference coordination in a network environment in accordance with one potential embodiment of the communication system;

FIG. 5 is a simplified flow diagram illustrating yet other example operations that can be associated with providing uplink interference coordination in a network environment in accordance with one potential embodiment of the communication system;

FIG. 6 is a simplified flow diagram illustrating yet other example operations that can be associated with providing uplink interference coordination in a network environment in accordance with one potential embodiment of the communication system;

FIG. 7 is a simplified flow diagram illustrating yet other example operations that can be associated with providing uplink interference coordination in a network environment in accordance with one potential embodiment of the communication system;

FIG. 8 is a simplified flow diagram illustrating yet other example operations that can be associated with providing uplink interference coordination in a network environment in accordance with one potential embodiment of the communication system;

FIG. 10 is a simplified schematic diagram illustrating example details that can be associated with example utility and total utility for a macro cell radio and an example set of small cell radios considered to be under the coverage of the particular macro cell radio in accordance with one potential embodiment.

DETAILED DESCRIPTION OF EXAMPLE EMBODIMENTS

Overview

Figure 1A:
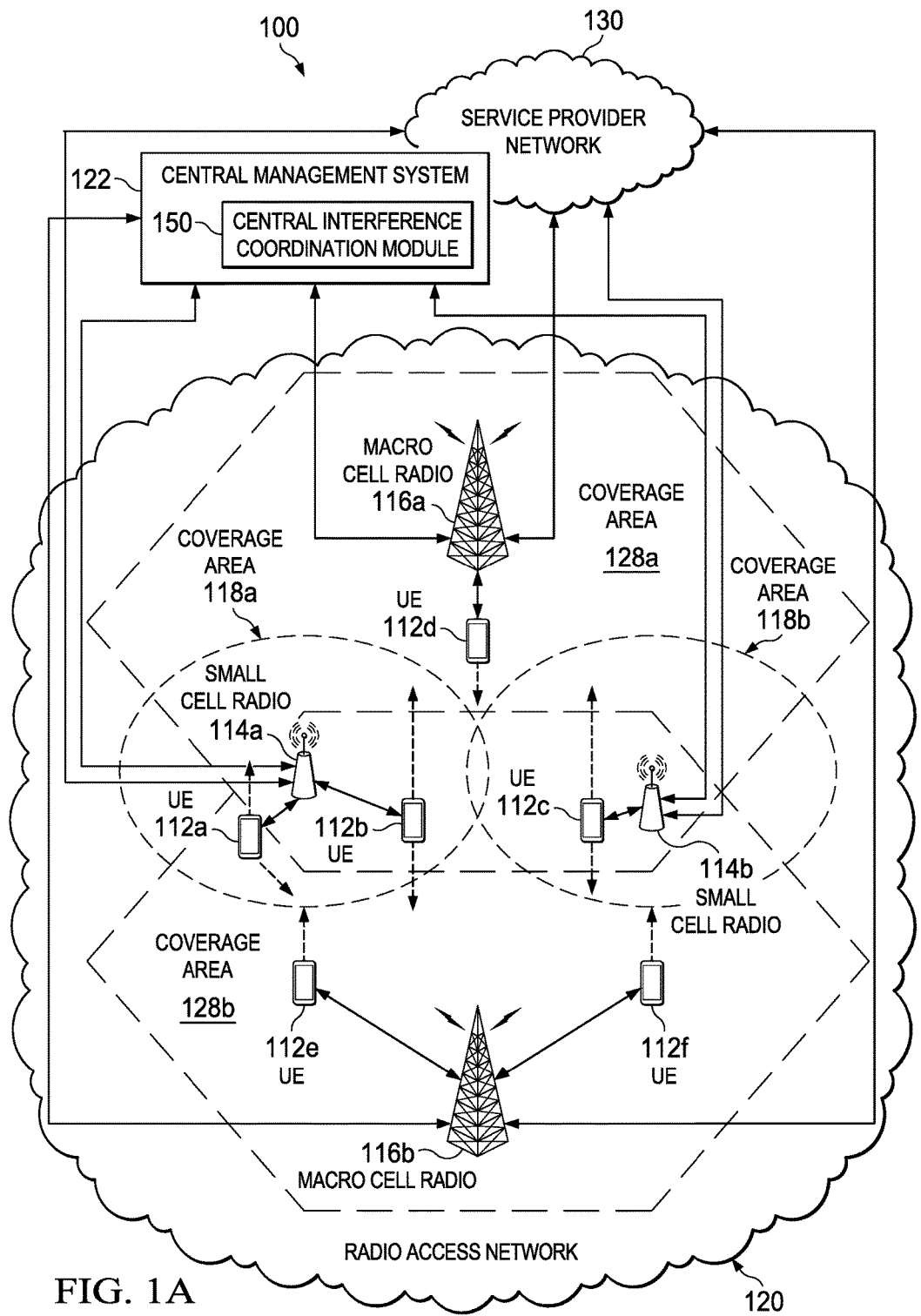
FIG. 1A is a simplified block diagram illustrating a communication system to facilitate providing uplink interference coordination in a network environment according to one embodiment of the present disclosure.

A method is provided in one example embodiment and may include determining for each of one or more macro cell radios, a corresponding set of one or more small cell radios that are under a coverage area of each of the one or more macro cell radios, wherein each corresponding set is associated with a corresponding macro cell radio; calculating interference coordination parameters for each small cell radio belonging to each corresponding set, wherein the interference coordination parameters for each small cell radio belonging to each corresponding set comprises an uplink interference budget for each small cell radio; and communicating the interference coordination parameters to each small cell radio belonging to each corresponding set.

In one instance, the interference coordination parameters for each small cell radio belonging to each corresponding can set further include: a maximum uplink interference level that can be caused towards a corresponding macro cell radio associated with a corresponding set for any uplink resource block to be transmitted by user equipment served by each small cell radio belonging to each corresponding set.

In one instance, a particular uplink interference budget for a particular small cell radio belonging to a particular set associated with a particular corresponding macro cell radio can indicate an average uplink interference budget that can be caused toward the particular corresponding macro cell radio by user equipment served by the particular small cell radio.

In some cases, the method can further include receiving one or more interference budget parameters from each of the one or more macro cell radios. In one instance, particular interference budget parameters received for a particular macro cell radio can include one or more of: an identity of one or more small cell radios considered to be within a coverage area of the particular macro cell radio; an average interference caused to one or more small cell radios considered to be within a coverage area of the particular macro cell radio; measurement report information reported to the particular macro cell radio by one or more user equipment served by the particular macro cell radio; a total sum of utility of uplink user equipment throughput rates for one or more user equipment served by the particular macro cell radio; and a maximum interference that can be caused toward the particular macro cell radio for any uplink resource block transmitted by one or more user equipment served by one or more small cell radios considered to be within a coverage area of the particular macro cell radio.

In some cases, the method can further include receiving utility feedback information from each small cell radio belonging to each set, wherein the utility feedback information received for a particular small cell radio can include at least one of: a range of maximized utility values corresponding to a range of candidate average interference budget values that can be set for the small cell radio for each of a macro cell radio that the small cell radio is considered to be under; and a range of marginal utility values based on a range of maximized utility values calculated for each of a given macro cell radio that the small cell radio is considered to be under.

In some instances, for each of one or more particular small cell radios belonging to a particular set associated with a particular corresponding macro cell radio, calculating interference coordination parameters can further include: determining, for a predetermined range of total average uplink interference budget values for the particular corresponding macro cell radio, an optimum total average uplink interference budget value for the particular corresponding macro cell radio and an optimum average interference budget value for each particular small cell radio that corresponds to a combination of a maximized total utility of uplink user equipment throughput for user equipment served by the particular corresponding macro cell radio and a maximized total utility of uplink user equipment throughput for user equipment served by each particular small cell radio.

In still some instances, the method can include determining, for each total average uplink interference budget value for the particular corresponding macro cell radio, an optimum distribution of a corresponding total average uplink interference budget value across each of the one or more particular small cell radios based, at least in part, on marginal values associated with each particular small cell radio.

Example Embodiments

Referring to FIG. 1A, FIG. 1A is a simplified block diagram illustrating a communication system 100 to facilitate providing uplink (UL) interference coordination in a network environment according to one embodiment of the present disclosure. This particular configuration may be tied to the 3rd Generation Partnership Project (3GPP) Evolved Packet System (EPS) architecture, also sometimes referred to as the Long Term Evolution (LTE) EPS architecture. Alternatively, the depicted architecture may be applicable to other environments equally.

Figure 1B:
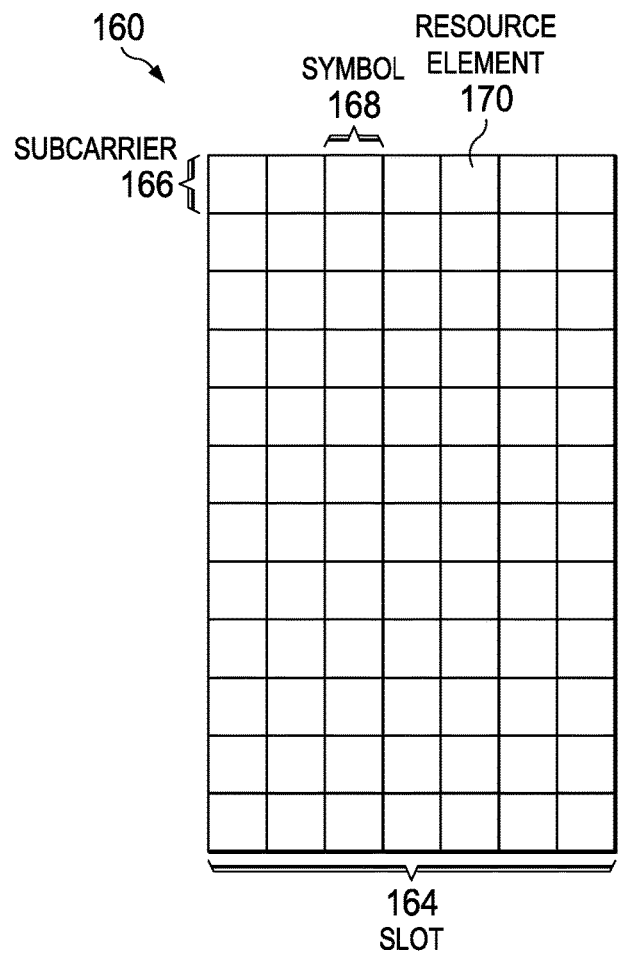
FIG. 1B is a simplified schematic diagram illustrating example details associated with an example resource block that can be associated with uplink transmissions in accordance with one potential embodiment of the communication system.

The example architecture of FIG. 1A can include users operating user equipment (UE) 112a-112f, one or more small cell radio(s) 114a-114b, one or more macro cell radio(s) 116a-116b, a radio access network (RAN) 120, a central management system 122 and a service provider network 130. Central management system 122 can include a central interference coordination module 150. Each small cell radio 114a-114b and each macro cell radio 116a-116b can be logically interconnected connected with central management system 122 and service provider network 130. FIG. 1B is a schematic diagram illustrating various example details that can be associated with communication system 100 and will be discussed in conjunction with FIG. 1A.

Each respective small cell radio 114a-114b can be associated with a respective small cell radio coverage area 118a-118b, as indicated by the respective dashed-line circle surrounding each respective small cell radio 114a-114b. Each respective macro cell radio 116a-116b can be associated with a respective macro cell radio coverage area 128a-12b, as indicated by the respective dashed-line hexagon surrounding each respective macro cell radio 116a-116b. In various embodiments, the macro cell radio coverage area for a given macro cell radio (e.g., macro cell radio 116a, 116b) can overlap, in whole or in part, with small cell radio coverage areas for one or more small cell radios (e.g., respective coverage areas for respective small cell radio 114a, 114b) such that the small cell radios can be considered to be under the coverage area for the macro cell radio. Additional discussions of whether a small cell radio is considered under the coverage of a given macro cell radio is described herein in further detail. It should be understood that the coverage areas shown in FIG. 1A are provided for illustrative purposes only, and are not meant to limit the broad scope of the teachings of the present disclosure. Any other coverage areas (e.g., coverage area size/range) can be provided by cell radios within the scope of the present disclosure.

In various embodiments, UE 112a-112f can be associated with users, employees, clients, customers, etc. wishing to initiate a flow in communication system 100 via some network. The terms 'user equipment', 'mobile node', 'end user', 'user', and 'subscriber' are inclusive of devices used to initiate a communication, such as a computer, a personal digital assistant (PDA), a laptop or electronic notebook, a cellular telephone, an i-Phone™, iPad™, a Google Droid™ phone, an IP phone, or any other device, component, element, or object capable of initiating voice, audio, video, media, or data exchanges within communication system 100. UE 112a-112f may also be inclusive of a suitable interface to a human user such as a microphone, a display, a keyboard, or other terminal equipment.

UE 112a-112f may also be any device that seeks to initiate a communication on behalf of another entity or element such as a program, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another. In some embodiments, UE 112a-112f may have a bundled subscription for network access and application services (e.g., voice), etc. Once the access session is established, the user can register for application services as well, without additional authentication requirements. IP addresses can be assigned using dynamic host configuration protocol (DHCP), Stateless Address Auto-configuration, default bearer activation, etc., or any suitable variation thereof. In various embodiments, each UE 112a-112f can include one or more transmitters and/or receivers (e.g., transceivers) and one or more antenna(s) to facilitate over the air communications with one or more small cell radios 114a-114b and/or macro cell radios 116a-116b.

In various embodiments, interfaces and/or a series of interfaces can be provided in communication system 100 (e.g., for elements of communication system 100), which can offer interoperation for mobility, policy control, uplink power control, interference coordination or other operations between various elements of communication system 100. For example, interfaces can be used to exchange point of attachment, location, and/or access data for one or more end users, for example, users operating UE 112a-112f. In various embodiments, resource information, accounting information, location information, access network information, network address translation (NAT) control, etc. can be exchanged using a remote authentication dial in user service (RADIUS) protocol or any other suitable protocol where appropriate. Other communication protocols that can be used in communication system 100 can include DIAMETER protocol, service gateway interface (SGi), terminal access controller access-control system (TACACS), TACACS+, etc. to facilitate communications. In various embodiments, small cell radios 114a-114b may logically be connected to each other via an X2 interface (not shown in FIG. 1A), as defined in 3GPP standards.

RAN 120 is a communications interface between UE (e.g., 112a-112f) and service provider network 130 via small cell radios 114a-114b and/or macro cell radios 116a-116b. Via small cell radios 114a-114b and/or macro cell radios 116a-116b, RAN 120 may provide one or more coverage areas for servicing multiple end users and for managing their associated connectivity. The communications interface provided by RAN 120 may allow data to be exchanged between an end user and any number of selected elements within communication system 100. For example, RAN 120 may facilitate the delivery of a request packet (e.g., request for service(s)) generated by a given UE (e.g., UE 112a) and the reception of information sought by an end user associated with the UE. In various embodiments, RAN 120 may include 3GPP access networks such as, for example, Global System for Mobile Communications (GSM) Enhanced Data Rates for GSM Evolution (EDGE) Radio Access Network (GERAN), generally referred to as 2G; Universal Mobile Telecommunications System (UMTS) Terrestrial Radio Access Network (UTRAN), generally referred to as 3G; and/or evolved UTRAN (E-UTRAN), generally referred to as 4G, Long Term Evolution (LTE) and/or LTE-Advanced (LTE-A). In various embodiments, RAN 120 may include non-3GPP IP access networks such as digital subscriber line (DSL), Cable, wireless local area network (WLAN) (e.g., Wireless Fidelity (WiFi), Worldwide Interoperability for Microwave Access (WiMAX)) and/or the Internet. RAN 120 is only one example of a communications interface between an end user and service provider network 130. Other suitable types of communications interfaces may be used for any appropriate network design and, further, be based on specific communications architectures in accordance with particular needs.

In general, service provider network 130 represents a series of points or nodes of interconnected communication paths for receiving and transmitting packets of information that may propagate through communication system 100. In various embodiments, service provider network 130 can be configured according to 3GPP standards to include one or more elements of an Evolved Packet Core (EPC), a packet-switched (PS) architecture and/or a circuit-switched (CS) architecture as prescribed by 3GPP standards in order to provide services (e.g., voice, data, multimedia, etc.) and interconnectivity to UE 112a-112f to one or more packet data networks (e.g., the Internet).

In various embodiments, service provider network 130 may offer communicative interfaces between UE 112a-112f and selected nodes or elements in the network, and may be any local area network (LAN), wireless local area network (WLAN), metropolitan area network (MAN), wide area network (WAN), virtual private network (VPN), Intranet, extranet, or any other appropriate architecture or system that facilitates communications in a network environment. In some embodiments, communications in a network environment can be facilitated through the exchange of packets. A packet is a formatted unit of data and can contain both control information (e.g., source and destination address, etc.) and data, which is also known as payload. Network traffic can be sent and received according to any suitable communication messaging protocols. Suitable communication messaging protocols can include a multi-layered scheme such as the Open Systems Interconnection (OSI) Model, or any derivations or variants thereof. For example, communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs. However, any other suitable communication protocol for transmitting and receiving data packets within communication system 100 may be alternatively implemented.

In various embodiments, each macro cell radio 116a-116b can be deployed as an evolved Node B (eNodeB or eNB), which can provide cellular/mobile coverage for a 4G/LTE macro cell network, or a Node B (NodeB), which can provide cellular/mobile coverage for a 2G/3G macro cell network. In general a NodeB is deployed in conjunction with a Radio Network Controller (RNC), which may provide radio control for the NodeB. In various embodiments, macro cell radio 116 can be responsible for selecting a Mobility Management Entity (MME) or a serving General Packet Radio Service (GPRS) support node (SGSN) within service provider network 130 for session establishment for each UE served by each macro cell radio 116a-116b, for managing radio resources for such UE, and making handover decisions for such UE, for example, handover to other cell radios (e.g., eNodeBs and/or HeNBs).

In various embodiments, each small cell radio 114a-114b can be deployed as home evolved NodeBs (HeNBs), which can provide cellular/mobile coverage for a 4G/LTE small cell network, and/or can be deployed has Home Node Bs (HNBs), which can provide cellular/mobile coverage for a 2G/3G small cell network. In some embodiments, each small cell radio 114a-114b can be deployed as a 'single-stack' device offering 4G/LTE or 2G/3G connectivity, a 'dual-stack' device offering 4G/LTE or 2G/3G connectivity in combination with wireless (e.g., WiFi) connectivity, or a 'triple-stack' device offering 4G/LTE connectivity, 2G/3G connectivity and wireless connectivity.

Typically, small cell radios operate at lower power levels as compared to macro cell radios to provide services to proximate users, for example, within in a business or residential environment (e.g., within a building, home, etc.). In some embodiments, small cell radios (e.g., 114a-114b) can be deployed in business (e.g., enterprise) environments within predefined clusters, grids or groups that can be optimized to provide contiguous or overlapping cellular/mobile coverage for enterprise users (e.g., employees, visitors, etc.) when such users are located within a coverage area of small cell radios deployed in such a cluster/grid. In some embodiments, small cell radios can be deployed in residential or densely populate environments to provide cellular/wireless connectivity in areas where macro cell radio coverage area(s) may be limited and/or overloaded.

In some embodiments, small cell radios 114a-114b can interface with service provider network 130 via one or more small cell gateways (not shown), which can be used to aggregate and/or manage sessions for UE connected to the small cell network. Small cell radios can be connected using a standard broadband digital subscriber line (DSL), internet or cable service into service provider network 130 via the one or more small cell gateways. Calls can be made and received, where the signals are sent (potentially encrypted) from a given small cell radio via the broadband Internet protocol (IP) network to one of the service provider's main switching centers. In some embodiments, small cell radios 114a-114b can also interface with a small cell management system, which can be used to manage configurations (e.g., communication protocols, data models, etc.) for small cell radios 114a-114b. In some embodiments, the small cell management system can be included within central management system 122 or can be provided separate from central management system. In various embodiments, each small cell radio 114a-114b can include one or transmitters and/or receivers (e.g., transceivers) and one or more antenna(s) to facilitate over the air communications with one or more UE served thereby.

As referred to herein in this Specification, a 'small cell radio' (e.g., small cell radio 114a, 114b) can be referred to interchangeably as a 'small cell', a 'femtocell' or a 'pico cell'. As referred to herein in this Specification, a 'macro cell radio' (e.g., macro cell radio 116a, 116b) can be referred to interchangeably as a 'macro cell', a 'macro radio' or a 'macro'.

As shown in FIG. 1A, central management system 122 can further include central interference coordination module 150, which can in various embodiments provide interference coordination operations to facilitate interference coordination between small cell radios 114a-114b and macro cell radios 116a-116b. In various embodiments, central management system 122 can be deployed as any central management entity, such as, for example, an Operations, Administration and Maintenance (OAM) entity, a Radio Management System (RMS), a Radio Resource Manager (RRM), a Self-Organizing Network (SON) management system, combinations thereof or the like. In certain embodiments, an RMS can be used in conjunction with small cell deployments, for example, to configure small cell radios 114a-114b according to a particular communications protocol (e.g., technical report (TR) 069) and data model (e.g., TR-196 version 2).

In some embodiments, a SON management system can have visibility of, and/o may interface with one or more parallel networks such as, for example, a macro cell network, a small cell network, a wireless local area network (WLAN), etc. and can be used to coordinate uplink power control and/or resource management for UE associated with small cell radios in a small cell deployment. In essence, a SON management system (e.g., central management system 122, depending on configuration) may provide a system-wide view of communication system 100 and can therefore intelligently provision small cell uplink power control parameters and/or resources among different communication networks in the communication system. Accordingly, central management system 122 can be configured to interface with any element or node of communication system 100 via one or more logical interfaces. In various embodiments, central management system 122 can be deployed within service provider network 130, within cloud-based service (e.g., in a centralized SON (cSON) architecture) and/or can be deployed in a service network for a particular deployment, such as, for example, in an enterprise small cell deployment.

Generally, Signal-to-Interference-plus-Noise Ratio (SINR) is used to describe or quantify signal quality for downlink transmissions to UE (e.g., from a serving cell radio to a UE) and/or uplink transmissions from UE (e.g., from a given UE to its serving cell radio). In some embodiments, SINR for a given UE (e.g., any of UE 112a-112f) can be determined or estimated based on one or more of: a Reference Signal Received Quality (RSRQ) as measured by the UE for the Evolved-Universal Terrestrial Radio Access (E-UTRA); a downlink channel quality indicator (CQI) reported by the UE through one or more measurement reports, relative Reference Signal Received Power (RSRP) and/or the received signal strength for an uplink transmission divided by the total interference in the cell. Typically, E-UTRA is described in reference to the air-interface for LTE radio access. In some embodiments, an expected or target SINR can be used in communication system 100 in order to determine and/or control uplink power control parameters for small cell UE, as discussed in further detail herein.

As defined in 3GPP TS 36.214, RSRP is the linear average over the power contributions of resource elements for resource blocks (RBs) that carry cell-specific reference signals (CRS) within a considered measurement frequency bandwidth. RSRQ is defined as the ratio of the number (N) of RBs of the E-UTRA carrier received signal strength indicator (RSSI) measurement bandwidth (e.g., system bandwidth) multiplied by the RSRP divided by the RSSI, generally expressed as 'N*RSRP/RSSI'. In general, a given UE can measure/determine signal strength information such as, for example, RSRP and/or RSRQ for a serving cell and/or non-serving cells (e.g., neighboring cells), if enabled and can send results of the measurements in one or more measurement reports to its serving cell. In certain embodiments, RSRP and/or RSRQ measurements for neighboring cells can be enabled for UE 112a-112f.

It should be noted that any UE signal strength information can be used among various embodiments described within the scope of the present disclosure for determining and/or controlling UE uplink power control parameters. In at least one embodiment, for example, for a 3G deployment, signal strength information can include Common Pilot Channel (CPICH) energy per chip to total PSD at the UE antenna (Ec/Io) and/or CPICH Received Signal Code Power (RSCP) as defined in 3GPP standards. In another embodiment, for example, for a WiFi deployment, signal strength information can include Received Signal Strength Indicator (RSSI), Received Channel Power Indicator (RCPI), combinations thereof, or other similar signal strength information. Accordingly, although many of the example embodiments discussed herein are described with reference to RSRP and/or RSRQ signal strength information, it should be understood that signal strength information as discussed for the various embodiments described herein can cover a multitude of access network types including both 3GPP and non-3GPP access networks.

In certain embodiments, downlink channel quality indicator (CQI) reported by a UE can be used to determine downlink SINR by using the CQI reported for a given UE as a proxy for determining downlink SINR. Generally, the CQI reported by a UE may be used to determine the Modulation and Coding Scheme (MCS) at which the cell radio to which the UE is connected needs to transmit packets to the UE such that the UE will receive packets at a 10% Block Error Ratio (BLER). If an Average White Gaussian Noise (AWGN) channel is assumed for the UE, an SINR can be determined that will lead to a 10% BLER based on the MCS chosen by the cell radio for downlink transmissions to the UE via the Physical Downlink Shared Channel (PDSCH), which carries data transport blocks (e.g., RBs) to the UE. Generally, each MCS from which the cell radio can choose for downlink transmissions can be mapped to one or more SINR values or a range of SINR values, thereby enabling SINR determinations using the MCS chosen for downlink transmissions. Although UE manufacturers often implement different receivers, etc. for their equipment, which can lead to non-one-to-one MCS to SINR mappings, CQI can be used to determine an approximate SINR for a given UE based on the assumption that, as SINR increases for a UE, CQI can also increase because the UE can decode higher order modulation schemes while staying within the 10% BLER threshold.

Under an assumption of approximate uplink and downlink symmetry for a given UE, uplink or downlink SINR can be used for various embodiments described herein. MCS can also be selected for UE for uplink transmissions. As provided by 3GPP standards (e.g., TS 36.211), MCS for uplink UE transmissions can include Quadrature Phase Shift Keying (QPSK) and Quadrature Amplitude Modulation (QAM) including 16QAM, 64QAM and 256QAM with modulation order increasing from QPSK to 256QAM.

As illustrated FIG. 1A, UE 112a-112b may be located in relative proximity within the coverage area 118a of small cell radio 114a, which may be the serving or source cell radio for UE 112a-112b, as indicated by the solid line indicating interconnection between each of UE 112a-112b and small cell radio 114a. UE 112c may be located in relative proximity within the coverage area 118b of small cell radio 114b, which may be the serving or source cell radio for UE 112c, as indicated by the solid line indicating interconnection between UE 112c and small cell radio 114b. It should be understood that the location of UE 112a-112c in relation to small cell radios 114a-114b is provided for illustrative purposes only and is not meant to limit the broad scope of the present disclosure. UE 112d, not being within the coverage area for either small cell radio 114a or 114b or macro cell radio 116b but within the coverage area 128a of macro cell radio 116a can be served by macro cell radio 116a, as indicated by the solid line indicating interconnection between UE 112d and macro cell radio 116a. UE 112e-112f, not being within the coverage area for either small cell radio 114a or 114b or macro cell radio 116a but within the coverage area 128b of macro cell radio 116b can be the served by macro cell radio 116b, as indicated by the solid line indicating interconnection between each of UE 112e-112f and macro cell radio 116b. As referred to herein, UE served by a macro cell radio can be referred to as 'macro UE' and UE served by a small cell radio can be referred to as 'small cell U E'.

It should be understood that UEs can be distributed anywhere within the coverage areas of small cell radios 114a-114b or macro cell radios 116a-116b within the scope of the teachings of the present disclosure. The locations of the UEs are provided for illustrative purposes only.

In at least one embodiment, small cell radio 114a can manage scheduling and power control for uplink radio resources to be transmitted by each UE 112a-112b; small cell radio can manage scheduling and power control for uplink radio resources to be transmitted by UE 112c; macro cell radio 116a can manage scheduling and power control for uplink radio resources to be transmitted by UE 112d; and macro cell radio 116b can manage scheduling and power control for uplink radio resources to be transmitted by UE 112e-112f. Scheduling and power control operations performed by small cell radios 114a-114b can be subject to interference coordination parameters received from central management system 122 via central interference coordination module 150. Uplink radio resources may be those resources that are to be transmitted over an air interface by a particular UE (e.g., using one or more combinations of transmitters and/or antenna(s)) to be received by its serving cell radio (e.g., using one or more combinations of receivers and/or antenna(s)). For example, in certain embodiments, assuming UE 112a-112b are connected to and currently served by small cell radio 114a, small cell radio 114a can schedule uplink resources and set uplink power levels for uplink transmissions that may be carried out by UE 112a-112b. In turn, UE 112a-112b can perform uplink transmissions as scheduled by small cell radio 114a. Typically, uplink transmissions are scheduled via uplink grants that can be communicated by a serving cell radio to a corresponding UE. Similar uplink transmissions can be scheduled for UE 112c served by small cell radio 114b, for UE 112d by macro cell radio 116a and UE 112e-112f served by macro cell radio 116b.

In certain embodiments, LTE architectures can support multi-user access using Orthogonal Frequency-Division Multiple Access (OFDMA), which is a multi-user version of the orthogonal frequency-division multiplexing (OFDM) digital modulation scheme. Multiple accesses are achieved in OFDMA by assigning subsets of subcarriers to individual users. OFDMA allows for simultaneous transmissions from several users served by a particular cell radio. In certain embodiments, LTE architectures can also support multi-user access using Single Carrier Frequency Division Multiple Access (SC-FDMA), which is similar to OFDMA, but includes additional precoding.

Generally in LTE architectures, a given serving cell radio (e.g., small cell radio 114a) can schedule uplink transmissions for a given UE (e.g., UE 112a) by scheduling physical resource blocks, generally referred to as resource blocks (RBs), that are to be transmitted by the UE according to one or more uplink grants, as noted above. For example, using one or more uplink grants, small cell radio 114a can signal to the UE, when it can transmit uplink RBs or resources toward small cell radio 114a. Uplink grants are typically communicated to the UE via a physical downlink control channel (PDCCH) maintained between the UE and the serving cell radio. Typically, the PDCCH can be used to communicate information related to information downlink (DL) grant(s), uplink (UL) grant(s), power control, system configuration, random access, paging, etc. for UE.

An RB, as defined in 3GPP technical specification (TS) 36.211, is typically represented by a number of resource elements, each of which can be allocated within a symbol, for each of a particular subcarrier (e.g., frequency) that can be associated with a particular UE. An RB can generally be referred to as a 'slot' spanning 0.5 milliseconds (msec) of a 1 msec subframe. Thus, there are typically two RBs in each 1 msec subframe. The smallest unit of an RB is a resource element, which represents one subcarrier by one symbol. Thus, a RB can be schematically represented as spanning a portion of frequencies of system bandwidth (e.g., depending on the number of subcarriers in the RB) across a span of time (e.g., 0.5 msec) for each symbol included in the RB. For 4G/LTE, the number of subcarriers for an RB is 12, each spanning a 15 kilohertz (15 KHz subcarrier bandwidth), thus each RB represents a 180 KHz portion of system bandwidth. As system bandwidth can vary, such as, for example, between 1.25 megahertz (MHz) and 20 MHz, the number of available RBs that can be scheduled or allocated across UEs can vary, respectively between 6 and 100. Typically, a 10 MHz bandwidth corresponds to 50 available RBs that can be allocated to UEs served by a particular cell. It should be understood that RBs can be uplink RBs or downlink RBs, depending on the device transmitting the RBs.

Referring to FIG. 1B, FIG. 1B is a simplified schematic diagram illustrating an example uplink RB 160 that can be used for uplink transmissions in accordance with one potential embodiment of the communication system. Uplink RB 160 can represents a 0.5 millisecond (msec) slot 164 of a 1 msec transmission time interval (TTI) for a number of symbols 168 spread across a number of subcarriers 166. Each subcarrier can represent a 15 kiloHertz (kHz) chunk of system bandwidth in the frequency domain. Typically, two slots make up a 1 msec subframe. The number of subcarriers 166 is typically twelve (12) such that each RB can represent 180 kHz of system bandwidth. In various embodiments, the number of symbols 168 can depend on the cyclic prefix type for uplink transmissions (e.g., 7 symbols per RB for normal cyclic prefix or 6 symbols per RB for extended cyclic prefix). As noted, the smallest unit of a RB is a resource element, shown in FIG. 1B as resource element 170, which represents one subcarrier 166 by one symbol 168.

Before detailing some of the operational aspects of FIG. 1A, it is important to understand common characteristics of uplink interference that can occur in mobile communication networks. The following foundation is offered earnestly for teaching purposes only and, therefore should not be construed in any way to limit the broad teachings of the present disclosure.

Uplink data (e.g., RBs) is typically transmitted by UE using a Physical Uplink Shared Channel (PUSCH). Uplink control information is typically transmitted by UE using a Physical Uplink Control Channel (PUCCH). Uplink data transmissions by UE on the PUSCH can cause interference, typically referred to as power spectral density (PSD) interference or interference PSD, towards a particular serving cell radio and/or to one or more neighboring cell radios. Interference PSD or more generally interference, as represented herein using the parameter I, can be quantified as interference over thermal noise (IoT), which is the ratio of interference PSD to thermal noise PSD. Thermal noise PSD, as defined in 3GPP TS 26.214, is the white noise PSD on the uplink carrier frequency multiplied by the uplink system bandwidth.

As noted, uplink transmissions from a UE to its serving cell can cause interference toward one or more neighboring cells such as, for example, towards macro cell radios 116a-116b and UE served by the macro cell radios. Uplink interference by small cell UE that can be caused towards macro cell radios 116a-116b and UE served by the macro cell radios is illustrated in FIG. 1A by the dashed lines extending from UE 112a-112c towards macro cell radios 116a-116b. Uplink interference that can be caused towards small cell deployments and UE served by the small cells can include interference from UEs associated with neighboring small cells, and/or interference from UEs associated with neighboring macro cells. Uplink interference by macro cell UE that can be caused towards small cell radios 114a-114b and UE served by the small cell radios is illustrated in FIG. 1A by the dashed lines extending from UE 112d-112f. In at least one embodiment, interference caused towards a small cell from UEs associated with neighboring small cells can be assumed to be approximately 3 decibels (dB) to approximately 6 dB over noise; thus, interference from UEs associated with neighboring small cells can be assumed to be included in certain calculations described herein, even though not explicitly detailed. Interference caused towards a small cell from UE associated with a neighboring small cell is not shown in FIG. 1A.

For LTE, 3GPP specifications define different interference mitigation schemes such as, for example, interference reduction and inter cell interference coordination (ICIC). Interference reduction is typically associated with optimizing coverage and capacity for a network. ICIC is typically associated with the coordination of radio resources to mitigate inter cell interference. In the frequency domain, ICIC is often used to manage the allocation of RBs between cells in order to coordinate the use of frequency domain resources.

For uplink (UL) ICIC (e.g., interference coordination for uplink transmissions) between small cell and macro cell radios, an uplink (UL) interference budget is typically used to set an average interference that can be caused by small cell UE towards one or more neighboring macro cell radios. As referred to herein in this Specification, the terms 'interference budget' and 'interference constraint' can be used interchangeably to refer to the average uplink interference that can be caused by UE served by a given small cell radio toward a particular macro cell radio.

Current UL ICIC solutions focus on setting an interference budget at a macro cell radio as a pre-defined value, which small cell radios, which are located under the coverage area of the macro cell radio, are to meet. However, current solutions do not consider trade-offs between macro cell UE and small cell UE performance metrics, or alternatively, combined performance of the entire network in setting the interference budget. Considering such performance metric trade-offs is critical to providing increased capacity when there are many small cell radios under the coverage area of one macro cell radio.

In accordance with one embodiment, communication system 100 is configured to provide a system and method to facilitate uplink (UL) ICIC, generally referred to herein as uplink interference coordination, between macro and small cell radios. In various embodiments, uplink interference coordination between macro and small cells can be facilitated through determining uplink interference coordination parameters for each small cell radio that is considered to be under the coverage area of a given macro cell radio; sending the interference coordination parameters to each small cell radio; and providing radio resource optimization by each respective small cell radio to mitigate small cell to macro cell interference according to the interference coordination parameters received at each respective small cell radio. In various embodiments, the method provided by communication system 100 can be carried out using one or more hardware processors configured for each small cell radio 114a-114b, each macro cell radio 116a-116b and/or central management system 122.

A set of small cell radio(s) that are considered to be under the coverage area of a given macro cell radio can be identified based, at least in part on the average interference that can be caused by the macro cell radio towards neighboring small cell radios, as discussed in further detail herein. A small cell radio can be considered to be under the coverage area of more than one macro cell radio.

Embodiments of the present disclosure are focused on determining interference coordination parameters for one or more small cell radio(s) that are under the coverage area of one or more macro cell radio(s). For example, a first set of interference coordination parameters can be calculated for small cell radios 114a-114b with respect to macro cell radio 116a and a second set of interference coordination parameters can be calculated for small cell radios 114a-114b with respect to macro cell radio 116b.

In one embodiment, interference coordination parameters can be calculated by a central management entity (e.g., central management system 122 via central interference coordination module 150) based on information received from each macro cell radio (e.g., macro cell radios 116a-116b) and each small cell radio (e.g., small cell radios 114a-114b) for a given communication system (e.g., communication system 100). In one embodiment, interference coordination parameters for a particular set of small cell radio(s) considered to be under the coverage of a given macro cell radio can include: an interference budget per small cell radio(s) based on a total average interference across time and frequency that can be caused by small cell UE served by the set of small cell radio(s) towards the macro cell radio and a maximum interference PSD that can be caused by the small cell UE towards the neighboring macro cell radio for any given RB.

The total average interference that can be caused towards the macro cell radio (e.g., the total average tolerable interference for macro UEs associated with the macro cell radio) can be representative of 'total average interference budget' for the macro cell radio. The total average interference budget for a given macro cell radio can be distributed across small cell radio(s) considered to be under the coverage area of the macro cell radio in the form of small cell average interference budget(s) that can be assigned to each of the small cell radio(s). A small cell average interference budget for a given small cell radio can represent an average interference constraint that the small cell radio is to meet when allocating uplink RBs and power levels for UEs served by the small cell radio.

For various embodiments described herein, certain assumptions can be made regarding communication system 100 including: the power control scheme for each macro cell radio 116a, 116b is assumed to be outside the control of central management system 122; the power control scheme for small cell UEs is assumed to be fixed; and a handover threshold, which defines the threshold for handover between macro and small cell radios is assumed to be set by a network operator or service provider for calculations described herein. Typically, the macro cell determines uplink transmission power per UE connected thereto as a function of the number of RBs assigned to each UE.

Embodiments discussed herein can provide for optimizing: 1) the average interference level that a given small cell's UEs are allowed to cause toward one or more neighboring macro cell radio(s) on uplink transmissions (e.g., uplink interference caused towards macro UE); and 2) the maximum interference PSD that small cell UEs are allowed to cause towards one or more neighboring macro cell(s) (e.g., towards macro cell UE) on any RB for uplink transmissions. In one embodiment, the optimizations can be provided by solving an optimization problem for a performance metric that relates trade-offs in performance between macro and small cell UEs. In one embodiment, the performance metric can be the total network performance of UL UE transmissions. Variations in the performance metric can be evaluated by calculating a total sum of utility of uplink UE throughput rates across all cells, both macro cells and small cells, for a given deployment. In one embodiment, the total sum of utility of uplink throughput can be used to capture the minimum rate constraints that are needed to meet Quality of Service (QoS) levels for each UE in communication system 100.

The total sum of utility of small cell uplink (UL) UE throughput rates across all macro and small cell UEs can be calculated according to a utility function. The utility function can be used to determine when a maximized utility of uplink throughput rates can be expected for macro UE served by a particular macro cell radio and small cell UE served by one or more small cell radio(s) considered to be under the coverage area of the macro cell radio as a function an average interference budget for the macro cell radio and a respective average interference budget assigned to each respective small cell radio(s). Variations in the average interference budget for the macro cell radio and for each average interference budget assigned to each small cell radio(s) can effect changes in the total sum of utility of uplink UE throughput across the macro and small cell UE. In various embodiments, a utility function can be set (e.g., by a network operator, service provider, etc.) in order to determine a sum of utility of uplink UE throughput rates for different macro and small cell average interference budgets.

During operation, central management system 122 can receive macro interference budget parameters from each macro cell radio 116a, 116b and can receive utility feedback information from each small cell radio 114a, 114b. Each macro cell radio (e.g., macro cell radio 116a, 116b) can generate one or more messages to send one or more macro interference budget parameters to central management system 122. In various embodiments, macro interference budget parameters for a given macro cell radio can include one or more of: an identity of one or more small cell radio(s) (e.g. small cell radios 114a-114b) that belong to a set of small cell radio(s) considered to be under the coverage area of the macro cell radio; an average interference caused toward the one or more small cell radio(s) belonging to the set; measurement report information reported by each UE connected to the macro cell radio; a total sum of utility of uplink UE throughput rates that can be expected for one or more macro UE served by the macro cell radio as a function of different total average interference levels that can be caused towards the macro cell radio (e.g., as a function different macro interference budgets that can be set for the macro cell radio); and/or a maximum tolerable interference PSD that can be caused toward the macro cell radio on any given RB by small cell UE served by the set of small cell radio(s).

In one embodiment, a total sum of utility of macro UE uplink throughput rates for a given macro cell radio can be calculated based, at least in part, on: an average interference that can be caused toward macro UE(s) served by the macro cell radio, the UL transmit power of the macro UE(s), the channel gain from macro UE(s) towards the serving macro cell radio and the number of RBs allocated, on average, for uplink transmissions for the macro UE(s). Each macro cell radio 116a-116b can calculate different possible values of a total sum of utility of uplink through that can be expected for macro UE served by each macro cell radio as a function of a range different total average interference levels that can caused towards each macro cell radio. The different possible values of the total sum of utility can be included in the macro interference budget parameters sent from each macro cell radio 116a-116b to the central management system.

Each small cell radio (e.g., small cell radios 114a, 114b) can send central management system 122 utility feedback information based on one or more candidate average interference budgets that might be set for each small cell radio. In various embodiments, utility feedback information for a given small cell radio can include one or more of: utility information associated with different values of utility of uplink UE throughput rates as a function of a range of candidate average interference budget values that can be set for the small cell radio for each macro cell radio coverage area that the small cell radio is considered to be under; and/or marginal utility information associated with a difference between different values of utility of uplink UE throughput rates as a function of a range of candidate average interference budget values that can be set for the small cell radio for each macro cell radio coverage area that the small cell radio is considered to be under. UE throughput rates are typically represented in bits per sec (bps or bits/sec).

Calculations related to determining the utility of uplink UE throughput rates are discussed in further detail herein. Marginal utility at a particular candidate average interference budget B dB for a particular small cell radio can be calculated as the additional total utility for the small cell when the interference budget is increased to B+1 dB. In some embodiments, each small cell radio 114a-114nb can send utility information to the central management system 122, which can calculate marginal utility values for each small cell as a function of candidate average interference budgets that can be set at each small cell radio. In other embodiments, each small cell radio 114a-114b can individually calculate marginal utility values from the values of utility calculated at each small cell radio and the marginal utility information can be sent to the central management system 122.

Using macro interference budget parameters received from each of macro cell radios 116a and 116b and utility feedback information received from each of small cell radios 114a and 114b, central management system 122, via central interference coordination module 150, can calculate interference coordination parameters for each of the small cell radios for each macro cell coverage area that a given small cell radio is considered to be under.

In various embodiments, interference coordination parameters for a given small cell radio for a particular macro cell radio coverage area that the small cell radio is considered to be under can include, but not be limited to: an optimum average interference budget for the small cell radio and a maximum tolerable interference PSD that can be caused toward the macro cell radio on any given RB. The optimum average interference budget set for each small cell radio considered to be under the coverage of a given macro cell radio is the amount average interference that can be caused by small cell UEs toward macro cell UEs such that the total network performance of all small cell UEs and all macro UEs is maximized.

As discussed in further detail herein, interference coordination parameters can be calculated by the central management system 122, via central interference coordination module 150, through an iterative process in which a maximized total utility of uplink throughput across small cell UEs and macro cell UEs can be determined by searching across different total utility values that can be attained by varying the total average interference budget for a given macro cell radio and by varying the candidate average interference budget(s) for one or more small cell radio(s) considered to be under the coverage area of the macro cell radio.

In one embodiment, a bisection search can be used to determine the maximized total utility of uplink throughput. A bisection search can be used to increase efficiency and decrease processing time for determining when the total utility of uplink throughput is maximized. In general, a bisection search involves calculating successive maximum, minimum and median values of a variable, searching for a maximum value of the variable in relation to the maximum, minimum and median values for particular iteration of the bisection search and updating either the maximum and median or the minimum and median values for a next iteration to continue the search until a desired value of the variable is found (e.g., until the maximized total utility of uplink throughput is found).

Upon calculating interference coordination parameters, central management system 122 can send interference coordination parameters to each small cell radio 114a-114b. As discussed herein, the interference coordination parameters for a particular small cell radio (e.g., small cell radio 114a) can include, for each corresponding macro cell radio coverage area that the small cell radio is considered to be under, a corresponding optimum average interference budget and a corresponding maximum tolerable interference PSD that can be caused toward each corresponding macro cell radio on any given RB. In some embodiments, the maximum tolerable interference PSD that can be caused toward a given macro cell radio on any given RB can the value sent to the central management system 122 from the macro cell radio. In other embodiments, the maximum tolerable interference PSD that can be caused toward a given macro cell radio on any given RB can be calculated by the central management system 122 using measurement report information (e.g., small cell radio Cell-specific Reference Signal (CRS) RSRP measurements by macro UE(s) served by the macro cell radio) included in interference budget parameters sent from the macro cell radio.

In various embodiments, upon receiving interference coordination parameters, each small cell radio 114a-114b may allocate resources and set relative power levels for UE served thereby (e.g., UE 112a-112b for small cell radio 114a, UE 112c for small cell radio 114b) in order to meet the optimum average interference budgets assigned thereto to provide interference mitigation between the small cell radios and neighboring macro cell radios. In various embodiments, UE uplink power control parameters are computed jointly for all UEs associated with a particular small cell radio such that 1) a particular UE's transmit power is set lower than $P^{max}$, which may be a maximum capable transmit power for the UE; 2) a particular UE's transmit power is set such that the received signal power from the UE at the small cell serving the UE is higher than a certain offset (e.g., a target SINR) plus macro interference PSD plus a reference small cell interference PSD budget; or 3) an average interference budget constraint and a peak interference PSD (e.g., RB-specific) constraint provided by the central management system 122 to the small cell radio is satisfied for each macro coverage area that the small cell radio is considered to be under. A given RB that a UE is scheduled to transmit on can affect its constraint on the maximum PSD in setting UE transmit power level; thus, in various embodiments, a local optimization of UE transmit power level can be adjusted according to the allocation of RBs to UE served by each small cell radio 114a, 114b within an ICIC framework.

Figure 2A:
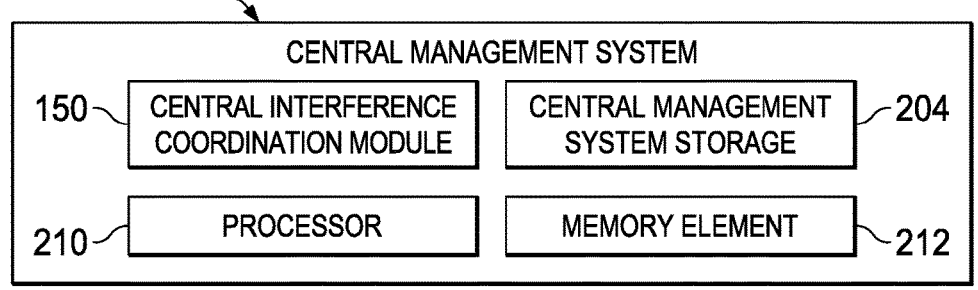
FIGS. 2A-2D are simplified block diagrams illustrating additional details associated with various potential embodiments of the communication system.
Figure 2B:
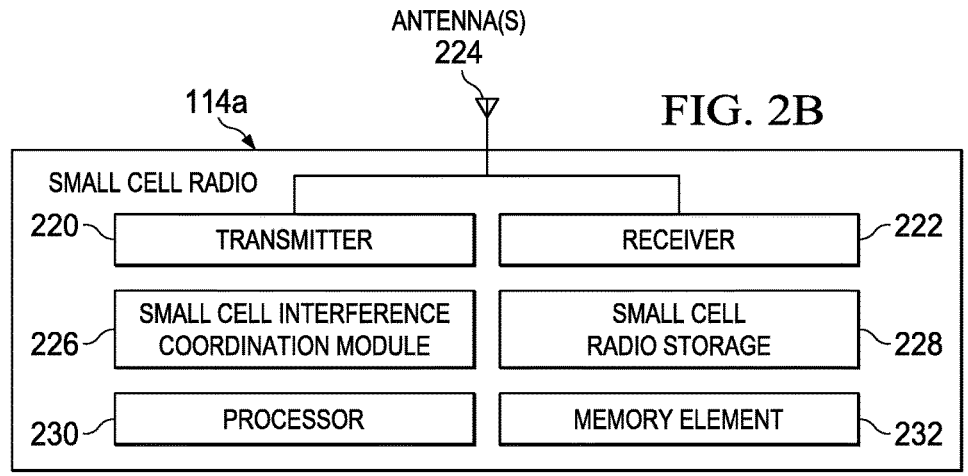
Figure 2C:
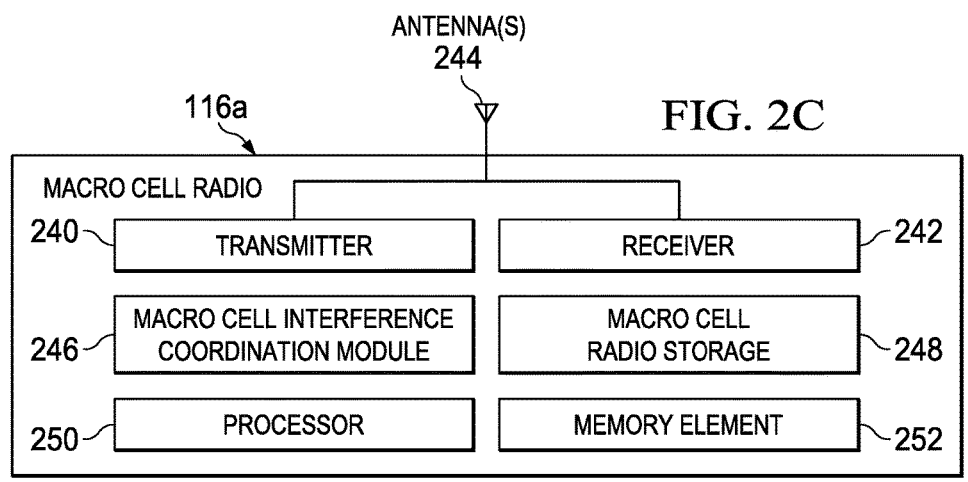
Figure 2D:
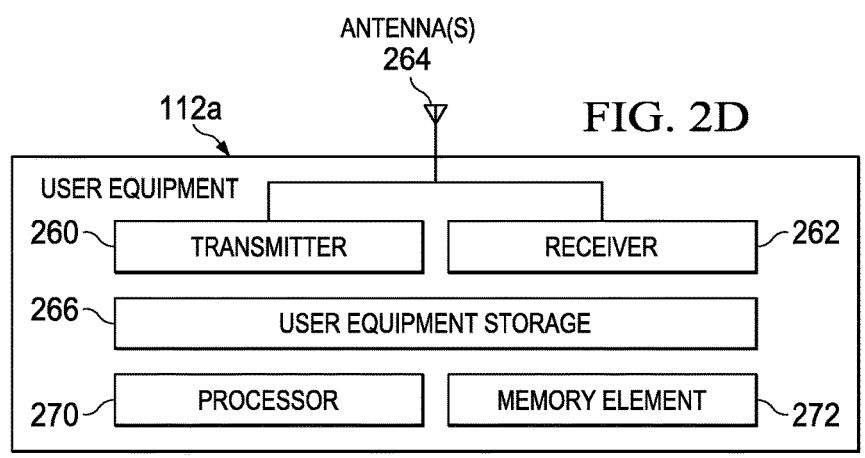

Turning to FIGS. 2A-2D, FIGS. 2A-2D are simplified block diagrams illustrating example details of various elements that can be associated with communication system 100 in accordance with one or more embodiments. FIG. 2A is a simplified block diagram illustrating example details that can be associated with central management system 122 in accordance with one embodiment of communication system 100. FIG. 2B is a simplified block diagram illustrating example details that can be associated with small cell radio 114a in accordance with one embodiment of communication system 100. FIG. 2C is a simplified block diagram illustrating example details that can be associated with macro cell radio 116a in accordance with one embodiment of communication system 100. FIG. 2D is a simplified block diagram illustrating example details that can be associated with UE 112a in accordance with one embodiment of communication system 100.

Although FIG. 2B describes example features related to small cell radio 114a, it should be understood that the example features as described for small cell radio 114a can also be provided with respect to small cell radio 114b. Although FIG. 2C describes example features related to macro cell radio 116a, it should be understood that the example features as described for macro cell radio 116a can also be provided with respect to macro cell radio 116b. Similarly, although FIG. 2D describes example features related to UE 112a, it should be understood that the example features as described for UE 112a can also be provided with respect to UE 112b-112f.

Referring to FIG. 2A, central management system 122 can include central interference coordination module 150, a central management system storage 204, at least one processor 210 and at least one memory element 212. In at least one embodiment, at least one processor 210 is at least one hardware processor configured to execute various tasks, operations and/or functions of central management system 122 as described herein and at least one memory element 212 is configured to store data associated with central management system 122. In at least one embodiment, central interference coordination module 150 is configured to implement various interference coordination operations as described herein for central management system 122, including, but not limited to, calculating interference coordination parameters and/or other operations as described herein. In various embodiments, central management system storage 204 can be configured to store information associated with various small cell uplink power control operations as described herein including, but not limited to, storing interference coordination parameters, macro interference budget parameters, small cell utility feedback information, set information (e.g., small cell radios identified as being under the coverage area of a given macro cell radio) combinations thereof or the like.

Referring to FIG. 2B, small cell radio 114a can include a transmitter 220, a receiver 222, one or more antenna(s) 224, a small cell interference coordination module 226, a small cell radio storage 228, at least one processor 230 and at least one memory element 232. In at least one embodiment, at least one processor 230 is a hardware processor configured to execute various tasks, operations and/or functions of small cell radio 114a as described herein and at least one memory element 232 is configured to store data associated with small cell radio 114a. In at least one embodiment small cell interference coordination module 226 is configured to implement various small cell interference coordination operations as described herein for small cell radio 114a, including, but not limited to, calculating utility feedback information based on one or more candidate average interference budgets and setting uplink transmit power levels for UE served thereby based on interference coordination parameters received from the central management system 122. In various embodiments, small cell radio storage 228 can be configured to store information associated with various small cell interference coordination operations as described herein including, but not limited to, utility feedback information for one or more candidate average interference budgets, marginal utility information, optimum average interference budgets received from the central management system, UE uplink power level information, and/or the reception of cellular data and/or information to/from (e.g., measurement report information) one or more UE (e.g., UE 112a-112b) served by small cell radio 114a using one or more over-the-air control channels and/or data channels, combinations thereof or the like. Transmitter 220, receiver 222 and one or more antenna(s) 224 can be configured to facilitate over the air communications with one or more UE.

Referring to FIG. 2C, macro cell radio 116a can include a transmitter 240, a receiver 242, one or more antenna(s) 244, a macro cell interference coordination module 246, a macro cell radio storage 248, at least one processor 250 and at least one memory element 252. In at least one embodiment, at least one processor 250 is a hardware processor configured to execute various tasks, operations and/or functions of macro cell radio 116a as described herein and at least one memory element 252 is configured to store data associated with macro cell radio 116a. In at least one embodiment, macro cell interference coordination module 246 is configured to implement various macro cell interference coordination operations as described herein for macro cell radio 116a, including, but not limited to, calculating one or more macro interference budget parameters to send to central management system 122. In various embodiments, macro cell radio storage 248 can be configured to store information associated with various macro cell interference coordination operations as described herein including, but not limited to, information related to macro interference budget parameters and/or the reception of cellular data and/or information to/from (e.g., measurement report information) one or more UE (e.g., UE 112e-112f) served by macro cell radio 116a using one or more over-the-air control channels and/or data channels, combinations thereof or the like. Transmitter 240, receiver 242 and one or more antenna(s) 244 can be configured to facilitate over the air communications with one or more UE.

Referring to FIG. 2D, UE 112a can include a transmitter 260, a receiver 262, one or more antenna(s) 264, a user equipment storage 266, at least one processor 270 and at least one memory element 272. In at least one embodiment, at least one processor 270 is at least one hardware processor configured to execute various tasks, operations and/or functions of UE 112a as described herein and at least one memory element 272 is configured to store data associated with UE 112*a*. In various embodiments, user equipment storage 266 can be configured to store information associated with UE 112*a* for the operation of UE 112*a*. In various embodiments, transmitter 260 and receiver 262 can be connected to one or more antenna(s) 264 to facilitate the transmission and/or reception of cellular data and/or information to/from one or more cell radios (e.g., small cell radio 114*a*) using one or more over-the-air control channels and/or data channels, combinations thereof or the like. Transmitter 260, receiver 262 and one or more antenna(s) 264 can be configured to facilitate over the air communications with one or more cell radios.

In regards to the internal structure associated with communication system 100, each of UE 112*b*-112*f*, small cell radio 114*b* and macro cell radio 116*b* may each also include a respective processor, a respective memory element and/or respective storage. Small cell radio 114*b* can additionally include one or more transmitters, receivers and/or antennas to facilitate over-the-air communications with UE, a respective small cell interference coordination module and respective storage. Macro cell radio 116*b* can additionally include one or more transmitters, receivers and/or antennas to facilitate over-the-air communications with UE, a respective macro cell interference coordination module and respective storage. Hence, appropriate software, hardware and/or algorithms are being provisioned in UE 112*a*-112*f*, small cell radio 114*a*-114*b*, macro cell radio 116*a*-116*b* and central management system 122 in order to facilitate uplink interference coordination operations as described for various embodiments discussed herein. Note that in certain examples, certain databases (e.g., for storing information associated with uplink interference coordination for communication system 100) can be consolidated with memory elements (or vice versa), or the storage can overlap/exist in any other suitable manner.

In one example implementation, UE 112*a*-112*f*, small cell radio 114*a*-114*b*, macro cell radio 116*a*-116*b* and central management system 122 are network elements, which are meant to encompass network appliances, servers, routers, switches, gateways, bridges, loadbalancers, firewalls, processors, modules, or any other suitable device, component, element, or object operable to exchange information that facilitates or otherwise helps coordinate and manage uplink interference between cell radios (e.g., for networks such as those illustrated in FIG. 1A). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these elements may include any suitable algorithms, hardware, software, components, modules, interfaces, or objects that facilitate the operations thereof. This may be inclusive of appropriate algorithms and communication protocols that allow for the effective exchange of data or information.

In various embodiments, UE 112*a*-112*f*, small cell radio 114*a*-114*b*, macro cell radio 116*a*-116*b* and central management system 122 may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'. Information being tracked or sent to UE 112*a*-112*f*, small cell radio 114*a*-114*b*, macro cell radio 116*a*-116*b* and central management system 122 could be provided in any database, register, control list, cache, or storage structure: all of which can be referenced at any suitable timeframe. Any such storage options may be included within the broad term 'memory element' as used herein. Similarly, any of the potential processing elements, modules, and machines described herein should be construed as being encompassed within the broad term 'processor'. Each of the network elements and/or user equipment can also include suitable interfaces for receiving, transmitting, and/or otherwise communicating data or information in a network environment.

Note that in certain example implementations, the uplink interference coordination operations as outlined herein may be implemented by logic encoded in one or more tangible media, which may be inclusive of non-transitory media (e.g., embedded logic provided in an ASIC, in digital signal processing (DSP) instructions, software [potentially inclusive of object code and source code] to be executed by a processor, or other similar machine, etc.). In some of these instances, memory elements [as shown in FIGS. 2A-2D] can store data used for the operations described herein. This includes the memory elements being able to store software, logic, code, or processor instructions that are executed to carry out the activities described herein. A processor (e.g., a hardware processor) can execute any type of instructions associated with the data to achieve the operations detailed herein. In one example, the processors [as shown in FIGS. 2A-2D] could transform an element or an article (e.g., data, information) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP processor, an EPROM, an electrically erasable PROM (EEPROM) or an ASIC that includes digital logic, software, code, electronic instructions, or any suitable combination thereof.

FIGS. 3-8 illustrate various simplified flow diagrams illustrating various example operations that can be associated with providing uplink interference coordination in a network environment in accordance with various potential embodiments of communication system 100. The operations discussed in FIGS. 3-8 may be described with reference to one or both of macro cell radios 116*a*-116*b* and/or one or both of small cell radios 114*a*-114*b*. It should be understood that any operations described with reference to one particular macro cell radio can be equally applicable to operations that can be performed by any other macro cell radio that may be present in the communication system for any deployment configuration. Similarly, it should be understood that any operations described with reference to one particular small cell radio can be equally applicable to operations that can be performed by any other small cell radio that may be present in the communication system for any deployment configuration.

Turning to FIG. 3, FIG. 3 is a simplified flow diagram illustrating example operations 300 that can be associated with providing uplink interference coordination in a network environment in accordance with one potential embodiment of communication system 100. At any time, uplink transmissions can be scheduled for UE served by one or more small cell radio(s) under the coverage area of one or more macro cell radio(s) (e.g., small cell radios 114*a*-114*b* beneath coverage area 128a for macro cell radio 116a and coverage area 128b for macro cell radio 116b). The uplink transmissions can be scheduled and the power levels for the uplink transmissions can be set based on interference coordination parameters received from a central management entity (e.g., interference coordination parameters calculated by central management system 122 via central interference coordination module 150).

Accordingly, the operations can begin at 302 in which the central management entity receives interference budget parameters from each of one or more macro cell radio(s). In various embodiments, interference budget parameters from a given macro cell radio (e.g., macro cell radio 116a or 116b) can include one or more of: an identity (e.g., E-UTRAN Cell Global Identity (ECGI)) of one or more small cell radio(s) (e.g. small cell radios 114a-114b) that belong to a set of small cell radio(s) that are considered to be under the coverage area of the macro cell radio; an average interference caused toward the one or more small cells under the coverage area; measurement report information reported by one or more UE connected to the macro cell radio (e.g., UE 112d connected to macro cell 116a or UE 112e-112f connected to macro cell 116b); a total sum of utility of UL UE throughput rates that can be expected for UE connected to the macro cell radio as a function of different total average interference levels that can be caused toward the macro cell radio; and/or a maximum tolerable interference PSD that can be caused toward the macro cell radio on any given RB. A macro cell radio can calculate different possible values of the total sum of utility of uplink throughput that can be expected for macro UE served by the macro cell radio as a function of a range different total average interference levels that can caused towards macro cell radio (e.g., as a function different total average interference budgets that can be set for the macro cell radio). The different possible values for the total sum of utility can be included in the macro interference budget parameters sent from the macro cell radio to the central management entity.

In at least one embodiment, a small cell radio $c_i$ can be identified as be under coverage area of a particular macro cell radio if the interference at $c_i$ due to transmission of at least one macro UE served by a given macro cell radio $m_k$ is greater than a predetermined interference threshold $I_{THRESH}$. By estimating the average interference caused towards each of one or more small cell radio(s) $c_i$ by a given macro cell radio $m_k$, the macro cell radio $m_k$ can identify a set of one or more small cell radio(s) that are considered to be under the coverage area of the macro cell radio $m_k$. A set of small cell radio(s) that are determined to be under the coverage area of a given macro cell radio $m_k$ can be represented as a set: $C(m_k) = \{c_1, c_2, \ldots, c_n\}$, where $N \geq 1$.

At 304, the operations can include the central management entity determining whether any small cell radios are a member of more than one set of small cell radio(s) considered to be under the coverage of any of the macro cell radio(s). For any small cell radio(s) that are a member of more than one set, the central management entity can estimate, at 306, the total average interference that can be caused towards a given small cell radio $c_i$ that is a member of more than one set by summing the estimated average interference that can be caused toward the small cell radio $c_i$ by each macro cell radio $m_k$ for which $c_i$ is a member of the set of small cell radio(s) considered to be under the coverage of the macro cell radio (e.g., such that $c_i \in C(m_k)$).

At 308, the operations can include the central management entity sending each of the one or more small cell radio(s) utility computation parameters. The utility computation parameters sent to each small cell radio(s) can be used by each small cell radio(s) to calculate utility feedback information to send to the central management entity. In various embodiments, utility computation parameters sent to given small cell radio can include one or more of: a value for an average interference that can be caused toward the small cell radio by macro UE associated with one or more neighboring macro cell radio(s) that the small cell radio is considered to be under; a minimum candidate average interference budget value for each macro cell radio(s) that the small cell radio is considered to be under; a maximum candidate average interference budget value for each macro cell radio(s) that the small cell radio is considered to be under; a $\Delta$ dB step size for calculating a maximized utility for a range of candidate average interference budget values that can be set for the small cell radio; and a CRS transmit power for each macro cell radio that the small cell radio is considered to be under. In one embodiment, the CRS transmit power for each corresponding macro cell radio can be sent with an ECGI of each corresponding macro cell radio.

If a small cell radio is a member of only one set, the average interference value sent to the small cell radio will correspond to the average interference value received from the macro cell that the small cell is considered to be under. If a small cell radio is a member of more than one set, the average interference value sent to the macro cell radio will correspond to the aggregate average interference (e.g., the sum of all average interference) that can be caused toward the small cell radio by all macro cell radios that the small cell is considered to be under. Each small cell radio(s) can calculate utility feedback information based, at least in part on the average interference information. The minimum and maximum candidate average interference budget values can depend on the average interference budget values that can be set for the macro cell radio and the maximum tolerable interference PSD that can be caused toward macro UEs associated with the macro cell radio. In various embodiments, the step size $\Delta$ dB can range from 1 dB to 3 dB.

At 310, the operations can include the central management entity receiving utility feedback information from the one or more small cell radio(s) under the coverage area of the one or more macro cell radio(s). In some embodiments, utility feedback information for a given small cell radio can be marginal utility information associated with a difference between different values of utility of uplink UE throughput rates as a function of a range of candidate average interference budget values that can be set for the small cell radio for each macro cell radio coverage area that the small cell radio is considered to be under. In some embodiments, utility feedback information for a given small cell radio can be utility information associated with different values of utility of uplink UE throughput rates as a function of a range of candidate average interference budget values that can be set for the small cell radio for each macro cell radio coverage area that the small cell radio is considered to be under.

At 312, the operations can include the central management entity determining interference coordination parameters for each set(s) of one or more small cell radio(s) that are under the coverage area of each of the one or more macro cell radio(s) using the interference budget parameters received from each macro cell radio(s) and the utility feedback information received from each small cell radio(s). In various embodiments, interference coordination parameters can include, but not be limited to: an optimum average interference budget for each small cell radio for each set to which each small cell radio belongs such that the optimum interference budget specifies an optimum average interference level that can be caused toward a neighboring macro cell radio associated with a corresponding set and a maximum tolerable interference PSD that can be caused towards the macro cell radio associated with the corresponding set on any given RB.

At 314, the operations can include sending the interference coordination parameters to each small cell radio(s) belonging to each set(s) and the operations can return to 302 in which additional macro interference budget parameters and utility feedback information can be received by the central management entity as UE transition locations, change serves, etc. within communication system 100.

Turning to FIG. 4, FIG. 4 is a simplified flow diagram illustrating other example operations 400 that can be associated with providing uplink interference coordination in a network environment in accordance with one potential embodiment of communication system 100. In particular, operations 400 can be associated with determining macro interference budget parameters by a given macro cell radio (e.g., macro cell radio 116b, via a macro interference coordination module configured for the macro cell radio) that can be sent to a central management entity (e.g., central management system 122) for determining interference coordination parameters that can be sent to one or more small cell radio(s) under the coverage area of the macro cell radio (e.g., small cell radios 114a-114b beneath coverage area 128b for macro cell radio 116b).

The operations can begin at 402 in which the macro cell radio receives measurement reports from macro UE (e.g., UE 112e-112f) served by the macro cell radio. In at least one embodiment, a measurement report received from a given macro UE can include measurement report information including, but not limited to: an ECGI, as defined in 3GPP standards, for each neighboring small radio detected by the macro UE and an RSRP measurement, or other signal strength measurement information, associated with a Cell-Specific Reference Signal (CRS) transmitted by each corresponding small cell radio. At 404, the macro cell radio receives CRS transmit power information for each small cell radio for a given deployment from the central management entity. Using measurement report information received from the macro UE served by the macro cell radio and the CRS transmit power for each small cell radio, the macro cell radio can determine various macro interference budget parameters at 406.

As discussed herein, macro interference budget parameters can include one or more of: a set of one or more small cell(s) (e.g. small cell radios 114a-114b) identified as being under the coverage area of the macro cell radio (e.g., macro cell radio 116b); an average interference caused toward the one or more small cell(s) belonging to the set; measurement report information reported by each UE connected to the macro cell radio; a total sum of utility of uplink UE throughput rates that can be expected for one or more UE connected to the macro cell radio as a function of total average interference levels that can be caused toward the macro cell radio; and/or a maximum tolerable interference PSD that can be caused toward the macro cell radio on any given RB. Upon determining the macro interference budget parameters, the macro cell radio sends the macro interference budget parameters to the central management entity at 408 and the operations can return to 402 in which the macro cell radio can receive additional measurement reports from UE served by the macro cell radio. In various embodiments, interference budget parameters can be determined by a macro cell radio according to a predetermined period of time that can be configured by a network operator or service provider. In various embodiments, the predetermined period of time can range from approximately 100 msec to approximately 15 minutes.

Turning to FIG. 5, FIG. 5 is a simplified flow diagram illustrating yet other example operations 500 that can be associated with providing uplink interference coordination in a network environment in accordance with one potential embodiment of communication system 100. In particular, operations 500 can be associated with determining macro interference budget parameters by a given macro cell radio (e.g., macro cell radio 116b, via a macro cell interference coordination module configured for the macro cell radio).

At 502, the macro cell radio receives measurement reports from macro UE served by the macro cell radio (e.g., UE 112e-112f). The measurement reports can include identity information (e.g., ECGI) and signal strength information (e.g., RSRP) for one or more neighboring small cell radio(s) (e.g., small cell radios 114a-114b) for which the macro UE are capable of sensing Cell-specific Reference Signals (CRS) being transmitted by the neighboring small cell radio(s). At 504, the macro cell radio can receive CRS power level information from a central management entity (e.g., central management system 122) for each small cell radio in the communication system.

At 506, the macro cell radio can estimate a total average interference caused towards one or more neighboring small cell radio(s). In one embodiment, estimating the total average interference caused by the macro cell radio towards one or more small cell radio(s) can include determining a path loss between each macro UE served by the macro cell radio and each of one or more small cell radio(s) for which signal strength information is reported by the macro UEs. Using the path loss and an estimation of resource allocations for macro UE served by the macro cell radio, a total average interference that a macro cell radio $m_k$ (e.g., macro cell radio 116b) causes towards a small cell radio $c_i$ (e.g., either of small cell radio 114a, 114b) can be estimated as described below.

Using macro UE RSRP measurements and the CRS power level information for each small cell radio $c_i$, a path loss (PL) between each of a macro UE u and each of a small cell radio $c_i$, denoted as herein as $PL_{UE}(c_i,u)$, can be calculated using the following relationship: '$PL_{UE}(c_i,u)$=CRS_TX_Power $(c_i)$–$RSRP_u$', where '$RSRP_u$' is the RSRP for small cell radio $c_i$ as reported to macro cell radio $m_k$ by macro UE 'u' and 'CRS_TX_Power$(c_i)$ is the transmit power of small cell radio $c_i$, which is known by the macro cell radio $m_k$ based on the CRS power level information received at 504.

An estimated resource allocation for each macro UE can be determined based on the channel conditions for the macro cell radio to determine the number of RBs that each macro UE transmits on, on average. In at least one embodiment, determinations of the estimated resource allocation for a macro UE can assume that the macro UE transmits at a highest PSD based on its corresponding power control parameters when '$\Delta_{mcs\text{-}enabled}$' (a common radio configuration setting) is set to FALSE and that resources are split equally among all UEs for proportional fair scheduling in order to maximize a sum logarithmic (LOG) utility across all UE served by a given macro cell radio. Setting $\Delta_{mcs\text{-}enabled}$=FALSE setting implies that the transmit PSD for UE served by a given small cell radio may remain constant irrespective of the MCS assigned thereto. For example, when considering macro UE 112e, 112f served by macro cell radio 116b for a 10 MHz system bandwidth in which 50 RBs can be allocated to UE, an estimated resource allocation for UE 112e can be 25 RBs and an estimated resource allocation for UE 112f can be 25 RBs.

The total average interference that can be caused by macro UE associated with a macro cell radio $m_k$ towards small cell UE associated with a small cell radio $c_i$ can be denoted as $I(c_i, m_k)$. Based on the estimated resource allocation for each macro UE and measurement reports received from each macro UE, the total average interference PSD that can be caused by macro UE associated the particular macro cell radio $m_k$ towards a particular small cell radio $c_i$ can be estimated such that $I(c_i,m_k)=\Sigma_{u \in U(m_k)}[\Delta(u)-PL_{UE}(c_i,u)]-10 \log_{10}|U(m_k)|$ where a parameter $U(m_k)$ is the set of macro UEs associated with macro cell radio $m_k$ and a parameter $\Delta(u)$ is the transmit power PSD for a UE u.

Upon estimating the total average interference caused toward each small cell radio, the macro cell radio (e.g., macro cell radio 116b) can identify a set of small cell radio(s) that are considered to be under the coverage area of the macro cell radio at 508. In at least one embodiment, a small cell radio $c_i$ can be identified as be under coverage area of a particular macro cell radio if the interference at $c_i$ due to transmission of at least one macro UE served by macro cell radio $m_k$ is greater than a predetermined interference threshold $I_{THRESH}$ (e.g., $I(c_i,m_k)>I_{THRESH}$). Thus, an estimation of the average interference caused towards each of one or more small cell radio(s) $c_i$ by macro UEs associated with a given macro cell radio $m_k$ can be used to identify a set of small cell radio(s) that are considered to be under the coverage of the macro cell radio. In one embodiment, a set of small cell radio(s) that are determined to be under the coverage area of a given macro cell radio $m_k$ can be represented as a set: $C(m_k)=\{c_1, c_2, \ldots c_N\}$, where $N \geq 1$. Given a particular interference threshold $I_{THRESH}$ level, it may be possible that not all small cell radios for which RSRP or other signal strength information was reported by macro UEs are determined to be under the coverage area of the macro cell radio. Thus, the set of small cell radio(s) identified at 508 could be less than the number of small cell radio(s) for which signal strength information was received.

At 510, the macro cell radio can determine a maximum tolerable interference PSD, which can be denoted as $I_{max\_m_k}$, that can be caused toward the macro cell radio for any given RB. In at least one embodiment, the operations at 510 can include defining a minimum desired SINR, say, for example, in the range of approximately −2 dB to approximately 3 dB, that macro UE can be expected to achieve on UL transmissions. Based on the minimum desired SINR, the maximum interference PSD can be set such that a high percentage (e.g., approximately 90% or more) of macro UEs served by the macro cell radio (e.g., UE 112e-112f) can obtain at least the minimum desired SINR when a single small cell UE causes the maximum interference PSD allowed.

At 512, the macro cell radio can calculate a total sum of utility of UL throughput rates that can be expected for macro UE served by the macro cell radio as a function of a range of total average interference levels that can be caused toward the macro cell radio (e.g., as a function of range of total average interference budgets that can be set for the macro cell radio).

Generally, MCS for a given UE can be representative of spectral efficiency, which can be represented in terms of bits per seconds (sec) per Hertz (Hz) (e.g., bits/sec/Hz). Uplink throughput for a given UE can be calculated as the average number of RBs assigned to the UE in one second multiplied by the average spectral efficiency of the UE (e.g., (average RBs assigned in one sec)*(average spectral efficiency of UE)).

In general, total utility of uplink throughput, which can be denoted herein using a parameter T, for UE u can be expressed as 'U(T(u))' for a given utility function U[•] such that determining a maximum utility can be expressed as 'max $\Sigma_u$ U(T(u))' for a given utility function U(T(u)) for all UE served by a given cell radio. In various embodiments, the choice of a particular utility function for the for determining a maximum utility for a system can be selected by a network operator or service provider according to a desired outcome as may be realized via a tradeoff between fairness of resource allocation and spectral efficiency for UE served by a given cell radio.

In at least one embodiment, a total sum of the LOG of spectral efficiency as a function of throughput T across UE(s) u, which can be expressed as '$\Sigma_u$ LOG(u))' for all UE served by a given small cell radio, can be selected as the utility function for the optimization problem if the desire is to maximize fairness of average UE throughput rates versus system capacity. This utility function is typically referred to as a proportional fair metric.

In another embodiment, a total sum of the average spectral efficiency as a function of throughput T across UE(s) u, which can be expressed as '$\Sigma_u$(T(u))', can be selected as the utility function for the optimization problem if the desire is to maximize average UE throughput rates across all UEs for a deployment. When this utility function is used, resources for UEs having the highest achievable rate are maximized, while other UEs, which may have lower rates, may be starved for resources. Thus, this utility function may provide for maximizing throughput while sacrificing fairness.

In another embodiment, a total sum of weighted exponentials of spectral efficiency, which can be expressed as '$\Sigma_u(1/T(u))_n$', can be selected as the utility function for the optimization problem if maximizing fairness of average UE throughput rates is most important. For the weighted exponentials utility function, increasing the value of 'n' can provide for more fair (e.g., more equal) UE throughput rates. In one or more embodiments, the utility function selected should be a concave, monotonically increasing function of T(u) such that $U^{-1}(•)$ is well defined. Thus, it should be understood that choice of utility function can be varied based on the desires of a network operator and/or service provider based on network fairness, capacity, spectral efficiency, throughput rates, combinations thereof or the like.

Under an assumption that each macro UE served by the macro cell radio is allocated an equal number of resources (e.g., assuming a proportional fair metric) and since the power control parameters of the macro UE are assumed to be fixed, a uplink throughput rates that can be expected for the macro UE can be calculated by determining the total average interference at the macro cell radio that can be caused by neighboring small cell radio(s) and the interference that can be caused by neighboring macro cell radio(s), determining the average SINR of each macro UE, converting the average SINR to average spectral efficiency for each UE and multiplying the average spectral efficiency for each UE by the average number of resources that can be allocated to each UE.

The total average interference at the macro cell radio, as can be caused by small cell UEs associated with neighboring small cell radios, which can be denoted as $I_{small \to m_k}$, can be calculated as $I_{small \to m_k}=\Sigma_i I_{c_i,m_k}$ for all small cells $c_i$ considered to be under the coverage of macro cell radio $m_k$. As referred to herein, a parameter $I_{c_i,m_k}$ can be used to represent the interference budget for a small cell radio $c_i$ belonging to the set of small cell radio(s) under the coverage of the macro cell radio (e.g., $c_i \in C(m_k)$). The total average interference at the macro cell radio, as can be caused by macro UEs associated with a neighboring macro cell radio $m_j$ (e.g., interference PSD from macro UEs associated with macro cell radio 116a towards macro UEs associated with macro cell radio 116b, and vice-versa), which can be denoted as $I_{m_j \to m_k}$, can be a function of the number of neighboring macro UEs served by the neighboring macro cell $m_j$, assuming an equal division of resources allocated among the neighboring macro UEs and a fixed power control scheme such that $I_{m_j \to m_k} = B\Sigma_{m_j \neq m_k} -10 \log_{10}|U(m_k)| \pm \Sigma_{u \in U(m_j)}[\Delta(u) - PL_{UE}(m_k,u)]$ where a parameter B is the total system bandwidth of operation and $PL_{UE}(m_k,u)$ is path loss from UE u associated with macro cell $m_j$ to macro cell $m_k$. The total average interference that can be caused interference that can be caused toward the macro cell radio by neighboring small cell radios and neighboring macro cell radios can be expressed as $I_{tot\_m_k} = I_{small \to m_k} + I_{m_j \to m_k}$ in dB milliwatts (dBm).

Using the total average interference that can be caused toward the macro cell radio, the SINR that can be attained by each macro UE according to Equation 1 (Eq. 1), as shown below.

$$p_{m_k}(r) + G_{u\_desired} - I_{tot\_m_k} \qquad \text{Eq. 1}$$

For Equation 1, a parameter '$p_{m_k}(r)$' can represent the average energy per resource element (EPRE) in dBm for an RB r transmitted by UE u over a number of subframes (e.g., a number of subframes that can be transmitted in one second) and a parameter '$G_{u\_desired}$' can represent a desired channel gain in dB from the UE u toward the macro cell radio on the RB r. In some embodiments, the desired channel gain can be estimated via RSRP measurements of the macro cell radio downlink transmissions as reported by UE u. In at least one embodiment, the average spectral efficiency of a UE u, which can be denoted as $s_u$, can be computed as a function of SINR in which $s_u = g(SINR)$, such that g is a function that maps SINR to MCS based on which Multiple Input Multiple Output (MIMO) scheme is used, a number of antennas, etc. for a given small cell radio.

Based on the average spectral efficiency determined for the UE, the throughput T(u) can be found such that T(u)= (average RBs assigned to UE u in one sec)*(average spectral efficiency of UE u)). In at least one embodiment, a range of average interference levels that can be caused toward the macro cell radio (e.g., a range of total average interference budget values that can be set for the macro) can be set based on the total average interference as calculated at 512 and the maximum tolerable interference PSD that can be caused toward macro UEs associated with the macro cell radio. In various embodiments, the range can extend from approximately 3 dB over thermal noise to approximately 9 dB over thermal noise. Using each of a plurality of values for the range of average interference levels, the macro cell radio can calculate expected uplink throughput for each macro UE served by the macro cell radio using the above calculations and the total sum of utility of uplink throughput rates for the macro UE for a selected utility function U(•) as a function of total average interference that can be caused toward the macro cell radio can be calculated as $\Sigma_u U(T(u))$. In various embodiments, a step size of $\Delta$ dB, which can range from 1 dB to 3 dB can be used to step across the range of average interference levels that can be caused toward the macro cell radio.

At 514, the macro cell radio can send macro interference budget parameters to a central management entity (e.g., central management system 122) including: the set of small cell radio(s) identified at 508 as being under the coverage of the macro cell radio; the estimate of the total average interference caused by macro UEs as determined at 506 towards the one or more small cell radio(s) belonging to the set; the maximum tolerable interference PSD that can be caused toward the macro cell radio on any given RB as determined at 510; and the total sum of utility of UL throughput rates that can be expected for macro UE as a function of total average interference levels that can be caused towards the macro cell radio as calculated at 512 and the operations can end.

Turning to FIG. 6, FIG. 6 is a simplified flow diagram illustrating yet other example operations 600 that can be associated with providing uplink interference coordination in a network environment in accordance with one potential embodiment of communication system 100. In particular, operations 600 can be associated with calculating utility feedback information by a given small cell radio $c_i$ (e.g., small cell radio 114a, via small cell interference coordination module 226 configured for the small cell radio).

In at least one embodiment, the operations performed by the small cell radio can include varying candidate average interference budgets for the small cell radio for a given macro cell radio $m_k$ to determine utility feedback information for the particular macro cell radio $m_k$, while holding any other average interference budget fixed for any other macro cell radio that the small cell radio $c_i$ may be under.

The small cell radio can calculate a range of utility and/or marginal utility of uplink throughput that can be expected for a range of corresponding candidate average interference budgets that might be assigned to the small cell radio for each of one or more macro cell radios having a coverage area that the small cell radio is under (e.g., for each set to which the small cell radio belongs).

At 602, the small cell radio receives measurement reports from macro UE served by the small cell radio (e.g., UE 112e-112f). The measurement reports can include identity information (e.g., ECGI) and signal strength information (e.g., RSRP) for one or more neighboring small cell radio(s) (e.g., small cell radios 114a-114b) for which the macro UE are capable of sensing Cell-specific Reference Signals (CRS) being transmitted by the neighboring small cell radio(s). At 504, the macro cell radio can receive CRS power level information from a central management entity (e.g., central management system 122) for each small cell radio in the communication system.

At 604, the small cell radio can receive utility computation parameters from the central management entity. The utility computation parameters can include: a value for an average interference that can be caused toward the small cell radio by macro UE associated with one or more neighboring macro cell radio(s) that the small cell radio is considered to be under; a minimum candidate average interference budget value for each macro cell radio(s) that the small cell radio is considered to be under; a maximum candidate average interference budget value for each macro cell radio(s) that the small cell radio is considered to be under; and a $\Delta$ dB step size for calculating a maximized utility for a range of candidate average interference budget values that can be set for the small cell radio.

In one embodiment, for a given candidate average interference budget and power control parameters, the small cell radio $c_i$ can compute fractions of RBs to be allocated to UE served by the small cell radio to optimize a sum of utility of uplink UE throughput rates for the small cell radio using Equation 2 (Eq. 2), as shown below, which seeks to maximize the sum of utility of uplink throughput rates for UE i served by the small cell radio $c_i$.

$$\max. \ \Sigma_i U_i(\alpha_i r(i)) \ \text{s.t.} \ \Sigma_i \alpha_i P_i - PL_{UE}(m_k, i) \leq I_{c_i m_k}$$
$$\forall m_k, \ \text{s.t.}, \ c_i \in C(m_k) \qquad \text{Eq. 2}$$

In at least one embodiment, operations associated with Eq. 2 can assume that $\Delta_{mcs\text{-}enabled}$=FALSE. For Equation 2, a parameter $U_i(\bullet)$ can represent a selected utility function for UE i. A parameter $\alpha_i$ represents the number of RBs allocated to UE i of small cell radio $c_i$. A parameter r(i) is the number of bits that UE i can transmit per RB. A parameter $P_i$ is the transmit power of UE i. A parameter $PL_{UE}(m_k, i)$ is the path loss from UE i to macro cell radio $m_k$ such that $PL_{UE}(c_i, i)$=CRS_TX_Power($m_k$)–$RSRP_i$ where $RSRP_i$ is the RSRP of the CRS transmitted by macro cell radio $m_k$ as measured by UE i.

In various embodiments, the number of bits that a UE can transmit on can vary based on the MCS set for the UE, which can depend on the average interference PSD that can be caused by neighboring macro UEs and/or other small cell UEs towards the UE. In at least one embodiment, interference from UEs associated with neighboring small cells can be assumed to be fixed at approximately 3 decibels (dB) over noise with respect to macro cell interference. The average interference PSD that can be caused by macro UEs associated with a macro cell $m_k$ (or with all macro cells that the small cell radio $c_i$ is considered to be under) can be received from the central management entity via the utility computation parameters. For a given small cell radio $c_i$ the fractions of RBs are allocated to UEs served by the small cell such that the sum of utility of uplink throughputs is maximized while meeting the interference constraints for neighboring macro cells.

In various embodiments, the transmit power $P_i$ for a given UE can be set such that: 1) a particular UE's transmit power is set lower than $P^{max}$, which may be a maximum capable transmit power for the UE; 2) a particular UE's transmit power is set such that the received signal power from the UE at the small cell serving the UE is higher than a certain offset (e.g., a target SINR) plus macro interference PSD plus a reference small cell interference PSD budget; or 3) an average interference budget constraint and a peak interference PSD (e.g., RB-specific) constraint provided by the central management system 122 to the small cell radio is satisfied for each macro coverage area that the small cell radio is considered to be under.

As noted above, the parameter $I_{c_i m_k}$ represents an average interference budget for small cell radio $c_i$ that belongs to the set of small cell radio(s) under the coverage of macro cell radio $m_k$. The value of $I_{c_i m_k}$ can be varied across a range of candidate average interference budget values that can be set for small cell radio $c_i$. A maximized utility of uplink throughput for small cell UEs associated with the small cell radio (e.g., UEs 112a-112b associated with small cell radio 114a) for each candidate average interference budget value using calculations based on the optimization problem represented by Eq. 2. Thus, at 606, the operations can include calculating a range of maximized utility of uplink throughput rates that can be expected for UEs served by the small cell radio $c_i$ as a function of a range of candidate average interference budget values that can be set for the small cell radio. In one sense, the maximized utility can be equivalent to a geometric mean of uplink UE throughputs for the number of UE served by the small cell radio $c_i$.

In at least one embodiment, a different range of maximized utility values can be calculated for a different range of candidate average interference budget values that can be set for the small cell radio for each macro cell radio $m_k$ for which the small cell radio $c_i$ is a member of the set of small cell radios under the coverage area of the macro cell radio (e.g., $c_i \in C(m_k)$). The range of candidate average interference budget values that can be set for a given small cell radio for one or more macro cell radios can be determined based on maximum and minimum candidate average interference budget values included in utility computation parameters sent to the small cell radio. In one embodiment, for a multi-vendor solution (e.g., small cell radios(s) being produced by different vendors).

In at least one embodiment, as shown at 608, the small cell radio can calculate a range of marginal utility values can be computed by the small cell radio based on a calculated range of maximum utility of uplink throughput rates for each macro cell radio $m_k$ for which the small cell radio $c_i$ is a member of the set of small cell radios under the coverage area of the macro cell radio (e.g., $c_i \in C(m_k)$). Marginal utility at a particular candidate average interference budget $I_{c_i m_k}$ dB for a particular small cell radio can be calculated as the additional total maximum utility for the small cell when the interference budget is increased to $I_{c_i m_k}$+1 dB. Thus, the marginal utility between two candidate average interference budget parameters can be found by determining the difference between the maximum utility calculated for each candidate average interference budget parameter.

At 610, the operations can include the small cell radio $c_i$ sending a central management entity (e.g., central management system 122) utility feedback information including one or more of: a range of maximized utility values corresponding to a range of candidate average interference budget values that can be set for the small cell radio for each of a given macro cell radio that the small cell radio is considered to be under; and/or a range of marginal utility values based on a range of maximized utility values calculated for each of a given macro cell radio that the small cell radio is considered to be under.

In one embodiment, utility feedback information that is associated with maximized utility values can be sent to the central management entity in a three-tuple format such as (macroID, max_utility, candidate_budget_val) for each maximized utility value (max_utility) calculated for each candidate average interference budget value (candidate_budget_val) for a given macro cell radio (macroID) that the small cell radio is considered to be under. In one embodiment, utility feedback information that is associated with marginal utility values can be sent to the central management entity in a four-tuple format such as (macroID, marginal_utility, candidate_budget_val1, candidate_budget_val2) for each marginal utility value (marginal_utility) that can be computed between a maximized utility value for a first candidate average interference budget value (candidate_budget_val1) and a maximized utility value for a second candidate average interference budget value (candidate_budget_val2) for a given macro cell radio (macroID) that the small cell radio is considered to be under.

Turning to FIG. 7, FIG. 7 is a simplified flow diagram illustrating yet other example operations 700 that can be associated with providing uplink interference coordination in a network environment in accordance with one potential embodiment of communication system 100. In particular, operations 700 can be associated with calculating uplink interference coordination parameters for one or more small cell radio(s) (e.g., small cell radios 114a-114b) by a central management entity (e.g., central management system 122, via central interference coordination module 150) for communication system 100.

Generally, operations related to calculating uplink interference coordination parameters for small cell radio(s)

belonging to a set that identifies small cell radio(s) considered to be under the coverage of a given macro cell radio can include performing a search on different values of utility of uplink throughput that can be expected across macro UEs and small cell UEs for total average interference levels that can be caused by the small cell radio(s) towards the macro cell radio. As discussed herein, the total average interference that can be caused toward a given macro cell radio, or more generally, the total average interference budget for the macro cell radio can be distributed across the small cell radio(s) in the form of optimum average interference budget(s), which can be used to constrain the uplink interference that can be caused by the UEs served by each small cell radio(s).

Different values of total utility of uplink throughput that can be expected across UEs served by the small cell radio(s) belonging to a set of small cell radio(s) considered to be under the coverage of a given macro cell radio and across UEs served by the macro cell radio can be calculated for each value of total average interference budget that can be set for the macro cell radio and for each candidate average interference budget that can be set for each small cell radio(s). The different values of total utility can be searched in order to determine a maximized total utility of uplink throughput for all the macro UEs associated with the macro cell radio and all the small cell UEs associated with the small cell radio(s) belonging to the set. The optimum total average interference budget for the macro cell radio (e.g., an optimum total average interference budget for the macro cell radio) and the optimum average interference budgets for each of the small cell radio(s) can be set based on the maximized total utility determined across all the macro UEs and all the small cell UEs.

In general, increasing the total average interference budget of the macro cell radio can result in lower uplink macro UE throughput (e.g., the macro UE can be more interfered by small cell UE) but can provide for higher uplink small cell UE throughput. The opposite is true in the converse, decreasing the total average interference budget for the macro cell radio can provide for higher uplink macro UE throughput (e.g., the macro UE can be less interfered by small cell UE) but can result in lower uplink small cell UE throughput. As noted earlier, a feature of the solution provided by the system and method of communication system 100 is that performance metric trade-offs (e.g., tradeoffs in utility of uplink throughput) between macro UE and small cell UE are considered in order to determine a maximized total utility of uplink throughput for communication system 100.

For illustrative purposes only, the embodiment shown in FIG. 7 is described with reference to a particular macro cell radio, such as, for example, macro cell radio 116b, and the set of small cell radios 114a, 114b identified as being under the coverage area 128b of macro cell radio 116b.

At 702, the operations include the central management entity receiving macro interference budget parameters from the macro cell radio 116b. At 704, operations include the central management entity receiving utility feedback information from each of small cell radios 114a-114b. For operations 700 an iteration index x can be set to an initialization value (e.g., x=1) as shown at 706. In one embodiment, the iteration index can be used to track iterations of the search operations performed by the central management entity. In some embodiments, a maximum iteration index can be set to limit the number of iterations that can be performed for the search operations.

At 708, an initial total average interference budget value can be set for the macro cell radio 116b. In one embodiment, the initial total average interference budget value can be set to a minimum total average interference budget value for the macro cell radio (e.g., a minimum tolerable average interference that can be caused toward the macro cell radio). For example, in one embodiment, the minimum total average interference budget value for a given macro cell radio can be set to 3 dB.

At 710, the operations can include the central management entity determining an optimum distribution of the total average interference budget value set for the macro cell radio 116b across each of one or more small cell radio(s) (e.g., small cell radios 114a-114b) belonging to the set of small cell radio(s) considered to be under the coverage area 128b of the macro cell radio to determine a candidate average interference budget value for each small cell radio(s).

One complexity of the solution provided by the system and method of communication system 100 is determining, for a particular total average interference budget value for a given macro cell radio, an optimum distribution of the total average interference budget value into average interference budget value(s) for each respective small cell radio(s) belonging to the set of small cell radio(s) considered to be under the coverage area of the macro cell radio. For a given macro cell radio $m_k$, the total average interference level that can be caused toward the macro cell radio or, as referred to herein, the total average interference budget for the macro cell, which can be represented using a parameter $I_{tot\_m_k}$ is to be distributed among UEs of small cell radios $c_i \in C(m_k)$. The constraint on total average interference budget as distributed across a number of small cell radios N such that $c_N \in C(m_k)$ can be represented as $I_{tot\_m_k} = I_{c_1 m_k} + I_{c_2 m_k} + \ldots + I_{c_N m_k}$. Interference from macro UEs associated with other macro cell radios is assumed to be fixed and known and is therefore not considered in $I_{tot\_m_k}$. The SINR of macro associated UEs will be based on the transmit power of the UEs, which is assumed to be known by the macro cell serving corresponding macro UEs, interference from other macro UEs, which is assumed to be fixed and known by the macro cell serving corresponding macro UEs and the interference from small cell UEs, which can be optimized using various techniques as discussed for various embodiments as described herein.

In at least one embodiment, the total average interference budget for macro cell $m_k$ can be distributed in a manner that meets an approximated optimality condition, denoted herein as A, which can be represented as shown below in Equation 3 (Eq. 3).

$$U_{c_i}(I_{c_i m_k} + 1 \text{ dB}) - U_{c_i}(I_{c_i m_k}) \approx \lambda, \forall c_i \in C(m_k) \qquad \text{Eq. 3}$$

Equation 3 can be interpreted as representing that a marginal increase in a small cell's utility when it's interference budget is increased by 1 dB (e.g., $U_{c_i}(I_{c_i m_k} + 1 \text{ dB})$) is about the same, as represented by the dual parameter $\lambda$, as when it's interference budget was 1 dB less (e.g., $U_{c_i}(I_{c_i m_k})$). The dual parameter $\lambda$ can represent a computed threshold, which can be used to determine when the distribution of a given total average interference budget for a macro cell radio $m_k$ has been optimized across candidate average interference budgets for each small cell radio(s) $c_i$ considered to be under the coverage of the macro cell radio. In one embodiment, concavity is assumed for the rate function of an individual UEs utility as a function of the average interference budget that can be set for the small cell radio serving the individual UE.

In general, the approximated optimality condition as illustrated by Equation 3 provides that the rate of increase of utility of uplink throughput for small cell UEs as a function of additional interference budget (e.g., 1 dB) should be about the same at all the small cell radios considered to be under the coverage area of macro cell radio $m_k$. This is not the same as stipulating that the utility is the same at all small cell radios, but rather stipulating that when the slope of the increase in utility across all small cell radios for a marginal increase in average interference budget at all small cells is approximately the same ($\lambda$), then the optimality condition can be met and the distribution of average interference budget for each small cell radio can be set for a particular total average interference budget for the macro when the optimality condition is met. In one embodiment, an optimal $\lambda$ is considered to be found if there is a $\lambda$ such that for all small cells $c_i$ considered to be under a macro cell $m_k$, when the average interference budget is increased and decreased by 1 dB compared to the utility found for a given iteration, the marginal utility range for the 2 dB difference contains the $\lambda$. In at least one embodiment, a bisection search can be performed to find the dual parameter $\lambda$.

Upon determining a candidate average interference budget value for each small cell radio(s) belonging to the set, the operations can include the central management entity calculating, at 712, a total utility of uplink throughput that can be expected across the macro UEs associated with the macro cell radio and the small cell UEs associated with the small cell radio(s).

In one embodiment, the calculating at 712 for a particular total average interference budget value and corresponding candidate average interference budget value for each small cell radio(s) can include performing a look-up on macro interference budget parameters received from the macro cell radio 116a to determine a corresponding utility of uplink throughput that can be expected for the macro UE associated with the macro cell radio at the total average interference budget value; performing a look-up on utility feedback information received from small cell radio 114a to determine a corresponding utility of uplink throughput that can be expected for the small cell UE served by the small cell radio at the candidate average interference budget determined for the small cell radio; performing a look-up on utility feedback information received from small cell radio 114b to determine a similar corresponding value for small cell radio 114b; and summing the total utility determined from each look-up to determine a total utility of throughput that can be expected across the macro and small cell UEs.

At 714, a determination can be made as to whether the iteration index is equal to the initialization value (e.g., whether x=1). If so, the operations can continue to 716 in which the maximized total utility for the search operations can be set to the calculated total utility as calculated at 712. At 718, the iteration index is incremented (e.g., x=x+1) and the operations continue to 720. At 720, the value of the total average interference budget for the macro cell radio can be updated and the operations can return to 710 in which an optimum distribution of the total average interference budget value that can be set for the macro cell radio across each of the one or more small cell radio(s) (e.g., small cell radios 114a-114b) to determine another candidate average interference budget value for each small cell radio(s). In one embodiment, the value for the total average interference budget updated at 720 can be increased by a Δ dB step size (e.g., 1 to 3 dB). The operations at 712 can also be repeated to calculate a new total utility of uplink throughput that can be expected across the macro UEs associated with the macro cell radio 116b for the updated total average interference budget value set for the macro cell radio and that can be expected across the small cell UEs associated with the small cell radios 114a-114b for each candidate average interference budget value for each small cell radio as determined via the optimum distribution determination at 710.

At 714, another determination can be made as to whether the iteration index is equal to the initialization value (e.g., whether x=1). For a subsequent pass through the search operations, the iteration would not be equal to the initialization value and the operations would continue to 722. At 722, the operations can include the central management entity determines whether the new calculated total utility is greater than the maximized total utility as was previously set.

If the calculated total is greater than the maximized total utility that was previously set, the operations can continue to 716 in which the maximized total utility can be set to the calculated total and the operations at 718, 720, 710, 712 and 714 can again be repeated.

However, if the calculated total is not greater than the maximized total utility, the operations can continue to 724 in which the central management entity can determine whether a maximum total average interference budget value that can be set for the macro cell radio 116b has been reached. In one embodiment, a maximum total average interference budget value for a given macro cell radio can be set to the maximum tolerable interference PSD that can be caused toward the macro cell radio on any given RB.

If the maximum total average interference budget value that can be set for the macro cell radio 116b has not been reached, the operations at 718, 720, 710, 712, 714, 722, etc. can be repeated until the maximum total average interference budget value that can be set for the macro cell radio 116b has been reached.

If the maximum total average interference budget value that can be set for the macro cell radio 116b has been reached, the operations can continue to 726 in which the central management entity sets respective interference coordination parameters for each respective small cell radio 114a, 114b based on the maximized total utility determined for the macro and small cell radios (e.g., the candidate average interference budget for each respective small cell radio for a particular total average interference budget that resulted in the maximized total utility can be used to set the optimum average interference budget for each respective small cell radio). At 728, the central management entity can send the respective interference coordination parameters to each respective small cell radio 114a, 114b belonging to the set of small cell radios considered to be under the coverage of the macro cell radio 116b. It should be understood that similar operations can also be performed with respect to macro cell radio 116a.

Each respective small cell radio can allocate resources to its respective UE according to RB allocations (e.g., that were determined when each small cell radio calculated its utility feedback information) corresponding to the optimum average interference budget set for each respective small cell radio.

In some embodiments, if a small cell radio receives interference coordination parameters for multiple macro cell radios that the small cell radio is considered to be under, the small cell radio can allocate resources to its UE using the tightest optimum average interference budget set for the small cell radio.

Referring to FIG. 8, FIG. 8 is a simplified flow diagram illustrating yet other example operations 800 that can be associated with providing uplink interference coordination in a network environment in accordance with one potential embodiment of communication system 100. In particular, operations 800 can be associated with determining an optimal distribution of a particular total average interference budget value for a macro cell radio into candidate average interference budget values for each of multiple small cell radios considered to be under the coverage area of the macro cell radio. In one embodiment, operations 800 can involve searching marginal utility values associated with the small cell radios until an approximate optimality condition is met, which indicates that an optimal λ has been found among the marginal utility values and setting candidate average interference budget values for the small cell radios based on the optimal λ that has been found. In one embodiment, the approximate optimality condition can be configured according to Equation 3 such that the approximate optimality condition is met when a marginal utility value for each small cell radio is approximately the same.

In one embodiment, substantially all of operations 800 for the embodiment shown in FIG. 8 can be performed via a central management entity (e.g., central management system 122, via central interference coordination module 150). In one embodiment, operations 800 shown can be performed by the central management entity at 710 for the operations shown in the embodiment of FIG. 7.

For the embodiment shown in FIG. 8, multiple small cell radios are considered to be under the coverage of a particular macro cell radio (e.g., small cell radios 114a-114b) under the coverage of macro cell radio 116b). It should be understood that if only one small cell radio were to be determined to be under the coverage of a given macro cell radio, then the total average interference budget for the macro cell radio could be distributed to the single small cell radio.

At 802, the operations can include the central management entity determining a marginal utility value for each small cell radio 114a, 114b belonging to the set of small cell radios considered to be under the coverage area of macro cell radio 116b for a subset of a range of candidate average interference budget values that can be set for each small cell radio.

In one embodiment, the subset of the range of candidate interference budget values can be associated with a first utility value as calculated for a first candidate average interference budget value (e.g., $U_{c_i}(I_{c_j m_k})$) that can be set for each small cell radio and a second utility value as calculated for a second candidate average interference budget value (e.g., $U_{c_i}(I_{c_j m_k}+1 \text{ dB})$) that can be set for each small cell radio. The marginal utility value for a given small cell radio for the subset of the range of utility values can be represented as $\Delta_{c_i}$. In one embodiment, the first candidate average interference budget value for each small cell radio can be a minimum candidate average interference budget value that can be set for each small cell radio.

In one embodiment, the marginal utility value for each small cell radio can be calculated by the central management entity by performing a look-up on maximized utility values included in utility feedback information received from each small cell radio using, at least in part, the subset of the range of candidate average interference values as indexes for the look-up. Based on the look-up, the difference between the maximized utility values for the subset can be calculated to determine the marginal utility for the subset. In another embodiment, the marginal utility value can be determined by the central management entity by performing a look-up on marginal utility values included in utility feedback information sent to the central management entity using, at least in part, the subset of the range of candidate average interference values as indexes for the look-up.

At 804, the operations can include the central management entity determining whether the optimality condition is met (e.g., whether optimal has been found). If the optimality condition is not met, the operations can continue to 806 in which the central management entity can determine another marginal utility value for each small cell radio 114a, 114b for another subset of the range of candidate average interference budget values and the check at 804 can be repeated. Operations 804 and 806 can continue until an optimal λ is found, at which point the operations can continue to 808 in which the central management entity can set the candidate average interference budget value for each small cell radio based on the optimal λ and the operations can end. In one embodiment, the candidate average interference budget value set for each small cell radio $c_i$ can be set to the value of $I_{c_j m_k}$ corresponding to the $U_{c_i}(I_{c_j m_k})$ value for the particular iteration of the search that resulted in the optimality condition being met at 804. In general, satisfying the optimality condition at 804 means that an optimal distribution of the particular total average interference budget value for the macro cell radio into candidate average interference budget values for each small cell radio has been determined.

Figure 9A:
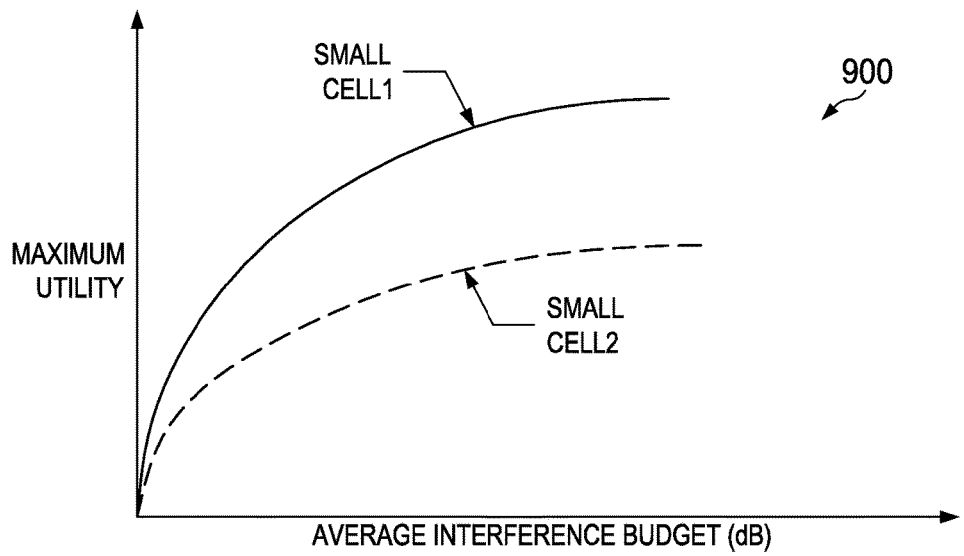
FIGS. 9A-9B are simplified schematic diagrams illustrating example details that can be associated with example utility and example marginal utility for an example set of small cell radios considered to be under the coverage of a particular macro cell radio in accordance with one potential embodiment.
Figure 9B:
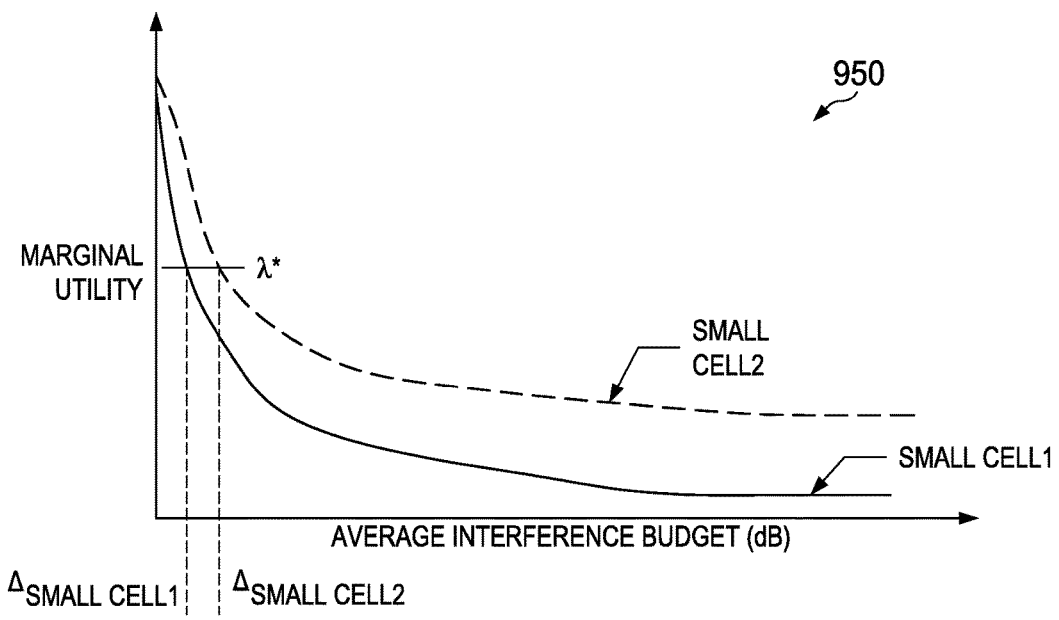

Turning to FIGS. 9A-9B, FIGS. 9A-9B are simplified schematic diagrams illustrating example details that can be associated with example utility values and example marginal utility values for an example set of small cell radios considered to be under the coverage of a particular macro cell radio. Referring to FIG. 9A, FIG. 9A is a simplified schematic diagram illustrating an example small cell utility versus average interference budget grid 900 for a first small cell radio (small cell1) and a second small cell radio (small cell2) considered to be under the coverage of the particular macro cell radio. A number of UEs are assumed to be served by the small cell radios and the macro cell radio.

FIG. 9A illustrates a first example range of maximum utility (solid-line) for small cell1, which represents a range of maximum utility of uplink throughput that can be expected for UEs associated with small cell1 as a function of average interference budget values that can be set for small cell1, and a second example range of maximum utility (dashed-line) is shown for small cell2, which represents a range maximum utility of uplink throughput that can be expected for UEs associated with small cell2 as a function of average interference budget values that can be set for small cell2.

As shown in FIG. 9A, the maximum utility of uplink throughput that can be expected for UEs associated with each small cell radio increases substantially with initial increases in average interference budget and then increases more gradually with additional increases in average interference budget.

Referring to FIG. 9B, FIG. 9B is a simplified schematic diagram illustrating an example small cell marginal utility versus average interference budget grid 950 for the first small cell radio (small cell1) and the second small cell radio (small cell2). FIG. 9B illustrates a first example range of marginal utility values (solid-line) for small cell1 and a second example range of marginal utility values (dashed-line) for small cell2. As discussed herein, the range of marginal utility values a small cell can represent the rate that slope of the maximum utility that can be expected for UEs associated with each small cell increases as a function of average interference budget that can be set for the small cell.

By searching the range of marginal utility values of each small cell in relation to the approximate optimality condition illustrated by Equation 3, an optimal λ (shown in FIG. 9B as λ*) can be found at a point such that a marginal utility value for small cell1 (shown in FIG. 9B as $\Delta_{SMALL\ CELL1}$) and a marginal utility value for small cell2 (shown in FIG. 9B as $\Delta_{SMALL\ CELL1}$) are approximately the same. The point at which $\Delta_{SMALL\ CELL1}$ intersects the axis representing average interference budget for grid 950 represents the average interference budget (e.g., a candidate and/or optimum average interference budget) that can be set for small cell1. The point at which $\Delta_{SMALL\ CELL2}$ intersects the axis representing average interference budget for grid 950 represents the average interference budget (e.g., a candidate and/or optimum average interference budget) that can be set for small cell2.

The range of maximum utility of uplink throughput that can be expected for UEs associated with each small cell radio, the range of marginal utility values associated with each small cell radio and the range of candidate average interference budget values shown in FIGS. 9A-9B are provided for illustrative purposes only and are not meant to limit the broad scope of the teachings of the present disclosure. For example, the range of the average interference budgets that can be set for the small cell radios can be based on a particular value of the total average interference budget that can be set for the macro cell radio that the small cell radios are considered to be under.

Turning to FIG. 10, FIG. 10 is a simplified schematic diagram illustrating example details that can be associated with example utility and total utility for a macro cell radio and an example set of small cell radios considered to be under the coverage of the particular macro cell radio in accordance with one potential embodiment. FIG. 10 illustrates a set of example utility versus total average interference budget grids. For the embodiment shown in FIG. 10, it is assumed that a set of small cell radios including a first small radio (small cell1), a second small cell radio (small cell2) and a third small cell radio (small cell3) are considered to be under the coverage of a particular macro cell radio. A number of UEs are assumed to be served by the small cell radios and the macro cell radio.

A first example grid 1000 illustrates an example range of total utility of uplink throughput that can be expected across UEs associated with the macro cell and the small cells as a function of total maximum interference over thermal noise PSD (in dB) that can be caused toward the macro cell. A second example grid 1050 illustrates an example range of combined maximum utility of uplink throughput that can be expected for UEs associated with the small cells (dashed-line) and a range of maximum utility of uplink throughput that can be expected for UEs associated with the macro cell (solid-line). The total utility of uplink throughput shown in grid 1000 represents the sum of the maximum utility of uplink throughput for the small cell radios and the macro cell radio that is shown in grid 1050.

Using operations as discussed for various embodiments described herein, a maximized total utility of uplink throughput across the small cell UEs and the macro cell UEs can be found, which can correspond to a peak value of the total utility shown in grid 1000. The point at which the maximized total utility of uplink throughput intersects the axis representing the total maximum interference over thermal noise PSD (in dB) that can be caused toward the macro cell can represent an optimum total average interference budget for the macro cell radio. An optimal distribution of the optimal total average interference budget for the macro cell radio across small cell radio1, small cell radio2 and small cell radio3 can be determined as discussed for the various embodiments described herein using utility feedback information for each of the small cell radios.

Note that in this Specification, references to various features (e.g., elements, structures, modules, components, steps, operations, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module as used herein this Specification, can be inclusive of an executable file comprising instructions that can be understood and processed on a computer, and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

As used herein, unless expressly stated to the contrary, use of the phrase 'at least one of' refers to any combination of the named elements, conditions, or activities. For example, 'at least one of X, Y, and Z' is intended to mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 100 may be applicable to other exchanges or routing protocols. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A computer-implemented method to provide uplink interference coordination in a network environment, the computer-implemented method comprising:
   receiving, from a macro cell radio, interference budget parameters including a total sum of utility of uplink user equipment (UE) throughput rates that can be expected for one or more UE served by the macro cell radio;
   receiving utility feedback information from each small radio of a plurality of small cell radios considered to be within a coverage area of the macro cell radio;
   identifying a maximized total utility across all UEs associated with the macro cell radio and across all UEs associated with the plurality of small cell radios, including determining a distribution of an average interference budget value for each small cell radio of the plurality of small cell radios for a total average interference budget for the macro cell radio; and
   setting interference coordination parameters for each small cell radio of the plurality of small cell radios based on the maximized total utility.

2. The method of claim 1, further comprising:
   communicating the interference coordination parameters to each small cell radio of the plurality of small cell radios.

3. The method of claim 1, wherein the interference coordination parameters comprise:
   a maximum uplink interference level that can be caused towards the macro cell radio for any uplink resource block to be transmitted by UEs served by each small cell radio of the plurality of small cell radios.

4. The method of claim 1, further comprising:
   determining a utility of uplink throughput that can be expected for UEs served by the macro cell radio based on the total average interference budget for the macro cell radio based on the total sum of utility of uplink UE throughput rates that can be expected for one or more UE served by the macro cell radio; and
   determining a utility of uplink throughput that can be expected or UEs served by each small cell radio of the plurality of small cell radios based on the average interference budget value for each small cell radio of the plurality of small cell radios and the utility feedback information received from each small cell radio of the plurality of small cell radios.

5. The method of claim 1, wherein the distribution of the average interference budget value for each small cell radio of the plurality of small cell radios is based on a determination that a change in utility for a 2 decibel (dB) difference in the average interference budget value for each small cell radio is approximately equal to an optimality threshold.

6. The computer-implemented method of claim 1, wherein the total sum of utility of uplink UE throughput rates that can be expected for one or more UE served by the macro cell radio comprises a function of different total average interference levels that can be caused towards the macro cell radio.

7. The computer-implemented method of claim 6, further comprising:
   communicating the interference coordination parameters to each small cell radio of the plurality of small cell radios;
   wherein the interference coordination parameters further comprise:
   a maximum uplink interference level that can be caused towards the macro cell radio for any uplink resource block to be transmitted by UEs served by each small cell radio of the plurality of small cell radios.

8. The computer-implemented method of claim 7, further comprising:
   determining a utility of uplink throughput that can be expected for UEs served by the macro cell radio based on the total average interference budget for the macro cell radio based on the total sum of utility of uplink UE throughput rates that can be expected for one or more UE served by the macro cell radio.

9. The computer-implemented method of claim 8, further comprising:
   determining a utility of uplink throughput that can be expected or UEs served by each small cell radio of the plurality of small cell radios based on the average interference budget value for each small cell radio of the plurality of small cell radios and the utility feedback information received from each small cell radio of the plurality of small cell radios.

10. The computer-implemented method of claim 9, wherein the distribution of the average interference budget value for each small cell radio of the plurality of small cell radios is based on a determination that a change in utility for a predetermined difference in the average interference budget value for each small cell radio is approximately equal to a predefined threshold.

11. The computer-implemented method of claim 10, wherein the predetermined difference comprises a 2 decibel (dB) difference, wherein the predefined threshold comprises an optimality threshold.

12. One or more non-transitory tangible media encoding logic that includes instructions for execution by a processor, wherein the execution causes the processor to perform operations to provide uplink interference coordination in a network environment, the operations comprising:
   receiving, from a macro cell radio, interference budget parameters including a total sum of utility of uplink user equipment (UE) throughput rates that can be expected for one or more UE served by the macro cell radio;

receiving utility feedback information from each small radio of a plurality of small cell radios considered to be within a coverage area of the macro cell radio;

identifying a maximized total utility across all UEs associated with the macro cell radio and across all UEs associated with the plurality of small cell radios, including determining a distribution of an average interference budget value for each small cell radio of the plurality of small cell radios for a total average interference budget for the macro cell radio; and setting interference coordination parameters for each small cell radio of the plurality of small cell radios based on the maximized total utility.

13. The media of claim 12, wherein the execution causes the processor to perform further comprising:

communicating the interference coordination parameters to each small cell radio of the plurality of small cell radios.

14. The media of claim 12, wherein the interference coordination parameters comprise:

a maximum uplink interference level that can be caused towards the macro cell radio for any uplink resource block to be transmitted by UEs served by each small cell radio of the plurality of small cell radios.

15. The media of claim 12, wherein the execution causes the processor to perform further operations, comprising:

determining a utility of uplink throughput that can be expected for UEs served by the macro cell radio based on the total average interference budget for the macro cell radio based on the total sum of utility of uplink UE throughput rates that can be expected for one or more UE served by the macro cell radio; and determining a utility of uplink throughput that can be expected or UEs served by each small cell radio of the plurality of small cell radios based on the average interference budget value for each small cell radio of the plurality of small cell radios and the utility feedback information received from each small cell radio of the plurality of small cell radios.

16. The media of claim 12, wherein the distribution of the average interference budget value for each small cell radio of the plurality of small cell radios is based on a determination that a change in utility for a 2 decibel (dB) difference in the average interference budget value for each small cell radio is approximately equal to an optimality threshold.

17. A system to provide uplink interference coordination in a network environment, the system comprising:

at least one memory element for storing data; and at least one processor for executing instructions associated with the data, wherein the executing causes the system to perform operations comprising:

receiving, from a macro cell radio, interference budget parameters including a total sum of utility of uplink user equipment (UE) throughput rates that can be expected for one or more UE served by the macro cell radio;

receiving utility feedback information from each small radio of a plurality of small cell radios considered to be within a coverage area of the macro cell radio;

identifying a maximized total utility across all UEs associated with the macro cell radio and across all UEs associated with the plurality of small cell radios, including determining a distribution of an average interference budget value for each small cell radio of the plurality of small cell radios for a total average interference budget for the macro cell radio;

setting interference coordination parameters for each small cell radio of the plurality of small cell radios based on the maximized total utility; and communicating the interference coordination parameters to each small cell radio of the plurality of small cell radios.

18. The system of claim 17, wherein the interference coordination parameters comprise:

a maximum uplink interference level that can be caused towards the macro cell radio for any uplink resource block to be transmitted by UEs served by each small cell radio of the plurality of small cell radios.

19. The system of claim 17, wherein the executing causes the system to perform further operations, comprising:

determining a utility of uplink throughput that can be expected for UEs served by the macro cell radio based on the total average interference budget for the macro cell radio based on the total sum of utility of uplink UE throughput rates that can be expected for one or more UE served by the macro cell radio; and determining a utility of uplink throughput that can be expected or UEs served by each small cell radio of the plurality of small cell radios based on the average interference budget value for each small cell radio of the plurality of small cell radios and the utility feedback information received from each small cell radio of the plurality of small cell radios.

20. The system of claim 17, wherein the distribution of the average interference budget value for each small cell radio of the plurality of small cell radios is based on a determination that a change in utility for a 2 decibel (dB) difference in the average interference budget value for each small cell radio is approximately equal to an optimality threshold.

* * * * *

UNITED STATES PATENT AND TRADEMARK OFFICE
CERTIFICATE OF CORRECTION

PATENT NO. : 10,349,284 B2  
APPLICATION NO. : 15/630696  
DATED : July 9, 2019  
INVENTOR(S) : Ritesh K. Madan et al.

Page 1 of 1

It is certified that error appears in the above-identified patent and that said Letters Patent is hereby corrected as shown below:

In the Specification

In Column 4, Line 28, delete "12b," and insert -- 128b, --, therefor.

In Column 10, Line 6, delete "U E'." and insert -- UE'. --, therefor.

In Column 15, Line 40, delete "114a-114nb" and insert -- 114a-114b --, therefor.

In Column 21, Line 51, delete "$c_n$}," and insert -- $c_N$}, --, therefor.

In Column 24, Line 45, delete "$(c_i)$-$RSRP_u$'," and insert -- $(c_i)$-$RSRP_u$' --, therefor.

In Column 26, Line 15, delete "'$\sum_u LOG(u))$'" and insert -- '$\sum_u LOG(T(u))$' --, therefor.

In Column 26, Line 33, delete "'$\sum_u (1/T(u))_n$," and insert -- '$\sum_u (1/T(u))^n$, --, therefor.

In Column 27, Line 10, delete "$\pm \sum_{u \in U}(m_j)$" and insert -- $+\sum_{u \in U}(m_j)$ --, therefor.

In Column 32, Line 46, delete "A," and insert -- $\lambda$, --, therefor.

In Column 36, Line 3, after "optimal" insert -- $\lambda$ --.

Signed and Sealed this  
Fourteenth Day of January, 2020

Andrei Iancu  
*Director of the United States Patent and Trademark Office*